United States Patent
Holmberg et al.

(10) Patent No.: US 9,800,521 B2
(45) Date of Patent: Oct. 24, 2017

(54) NETWORK SWITCHING SYSTEMS AND METHODS

(71) Applicant: Ciena Corporation, Hanover, MD (US)

(72) Inventors: Eric Arthur Holmberg, San Anselmo, CA (US); Paul Simon Nahlous, San Anselmo, CA (US); Balaji Subramaniam, Rohnert Park, CA (US)

(73) Assignee: Ciena Corporation, Hanover, MD (US)

( * ) Notice: Subject to any disclaimer, the term of this patent is extended or adjusted under 35 U.S.C. 154(b) by 515 days.

(21) Appl. No.: 13/975,865

(22) Filed: Aug. 26, 2013

(65) Prior Publication Data

US 2015/0055451 A1    Feb. 26, 2015

(51) Int. Cl.
| | | |
|---|---|---|
| *H04L 12/939* | (2013.01) | |
| *H04L 12/931* | (2013.01) | |
| *H04L 12/437* | (2006.01) | |
| *H04L 12/46* | (2006.01) | |
| *H04L 12/24* | (2006.01) | |
| *H04L 12/707* | (2013.01) | |

(Continued)

(52) U.S. Cl.
CPC .......... *H04L 49/557* (2013.01); *H04L 12/437* (2013.01); *H04L 12/462* (2013.01); *H04L 49/351* (2013.01); *H04L 41/082* (2013.01); *H04L 45/22* (2013.01); *H04L 45/28* (2013.01); *H04L 2012/421* (2013.01)

(58) Field of Classification Search
CPC .......... H04L 41/0654; H04L 46/351; H04L 46/557; H04L 49/351; H04L 49/557
USPC ......................................... 370/218
See application file for complete search history.

(56) References Cited

U.S. PATENT DOCUMENTS 5,909,564 A * 6/1999 Alexander ............ H04L 49/351
                                                    710/316
6,317,426 B1   11/2001 Afanador et al.
(Continued)

FOREIGN PATENT DOCUMENTS

EP          2302840 A1      3/2011

OTHER PUBLICATIONS

Feb. 16, 2017 Supplemental European Search Report on European Patent Application No. EP 14 84 0400.

*Primary Examiner* — Asad Nawaz
*Assistant Examiner* — Saad A Waqas
(74) *Attorney, Agent, or Firm* — Clements Bernard Walker PLLC; Christopher L. Bernard; Lawrence A. Baratta, Jr.

(57) ABSTRACT

Systems and methods are disclosed for effectuating control-plane changes at increased speeds to protect a network in which switching operations are performed. Operations to effectuate control-plane changes in the network can be divided between software and more-rapid, dedicated hardware within a line card. Examples of operations reserved to hardware implementation can include blocking and unblocking of ports, flushing of learned entries from switch tables, and coordination of control-plane changes through the generation of messages sent between nodes, and also between line cards of a node. Determinations about the need for hardware-driven, control-plane changes may be made based on events occurring in the network in accordance with any of a number of different network protection protocols. The protocol may be implemented in a state machine and the software may determine the state of the hardware through a master/slave relationship.

19 Claims, 14 Drawing Sheets

(51) Int. Cl.
    *H04L 12/703*    (2013.01)
    *H04L 12/42*    (2006.01)

(56) References Cited

U.S. PATENT DOCUMENTS

| | | | |
|---|---|---|---|
| 6,687,247 B1* | 2/2004 | Wilford | H04L 45/00 370/392 |
| 6,766,482 B1* | 7/2004 | Yip | H04L 12/437 370/216 |
| 7,240,364 B1* | 7/2007 | Branscomb | H04L 29/12113 726/5 |
| 9,705,824 B2* | 7/2017 | Wong | H04L 49/40 |
| 2005/0152335 A1* | 7/2005 | Lodha | H04L 45/38 370/351 |
| 2005/0259571 A1 | 11/2005 | Battou | |
| 2007/0000896 A1 | 1/2007 | Rose et al. | |
| 2009/0147672 A1* | 6/2009 | Chun | H04L 12/437 370/225 |
| 2009/0252030 A1* | 10/2009 | Kashyap | H04L 12/437 370/216 |
| 2010/0174770 A1 | 7/2010 | Pandya | |
| 2010/0246387 A1 | 9/2010 | Krishnan et al. | |
| 2012/0243405 A1* | 9/2012 | Holness | H04L 12/437 370/225 |
| 2012/0263194 A1* | 10/2012 | Wu | H04L 43/0852 370/503 |
| 2013/0258840 A1* | 10/2013 | Holness | H04L 49/00 370/222 |
| 2014/0211641 A1* | 7/2014 | Gohite | H04L 12/4641 370/252 |
| 2014/0355447 A1* | 12/2014 | Gohite | H04W 40/34 370/236 |

* cited by examiner

more particular description of the invention will be rendered by reference to specific embodiments illustrated in the appended drawings. Understanding that these drawings depict only typical embodiments of the invention and are not therefore to be considered limiting of

NETWORK SWITCHING SYSTEMS AND METHODS

FIELD OF THE INVENTION

This invention relates to networking protocols and more particularly to systems and methods for switch protection, or protecting a network implementing Ethernet switching services.

BACKGROUND OF THE INVENTION

An Ethernet network allows a frame of data to be sent from one computing device in the network to another computing device in the network based on a destination Media Access Control (MAC) address in the frame. To deliver the frame, individual nodes in the network process the frame and direct the frame, at the data link layer (layer 2 of the Open Systems Interconnection (OSI) model), to a next node, potentially to the exclusion of other nodes, until the frame arrives at the destination computing device. The processing and directing of frames in this manner is known as switching.

Switching can be accomplished through databases maintained at nodes in the network with entries indicating a port corresponding to different destination MAC addresses. An entry in the table can be established, through the flooding process, when a switch receives a frame with a new destination MAC address that is not yet listed. As part of the flooding process, the switch can broadcast an inquiry on all ports, excepting the port at which the frame was received, requesting recognition of the new address and resulting in similar requests from connected nodes. Eventually, a response from the computing device corresponding to the new destination MAC address can be relayed back to the requesting node over one or more paths. The requesting node then makes and updates an entry with a corresponding port based on the port through which the most recent response was received. However, if there is a loop in the network, nodes will continue to propagate the request, resulting in perpetual updates, until unacceptable portions of the network's bandwidth are occupied.

Therefore, a process of avoiding loops is desirable. At the same time, it is desirable to maintain redundancy in the network to provide alternatives in the event of failure. This can be accomplished through a network with many links that would result in loops if they were all operative, but which are systematically blocked to prevent loops. These loops can be opened to redirect traffic in the event of a failure. Protecting a network of switches from loops and recovering from link failures through redundancy is known as switch protection. Protocols, such as the Spanning Tree Protocol (STP), have been developed to provide a loop-free topology, while allowing redundancy that can be accessed to respond to failures in the network. However, over time, the demands placed on switching networks have created new issues that need a new approach to switch protection.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Over the years, the core concepts of data-layer switching embodied in Ethernet protocols have proven to be remarkably adaptive and useful. Also, over the years, network communications have evolved to place a focus on the delivery of services like video on demand, voice over internet protocol, and internet access. This adaptability of Ethernet lends itself to the implementation of Ethernet networks capable of providing these services. Also, the adaptability of Ethernet has allowed the size of such networks to continue to grow. For purposes of explanation, such a network is discussed below with the aid of the drawings.

Figure 1:
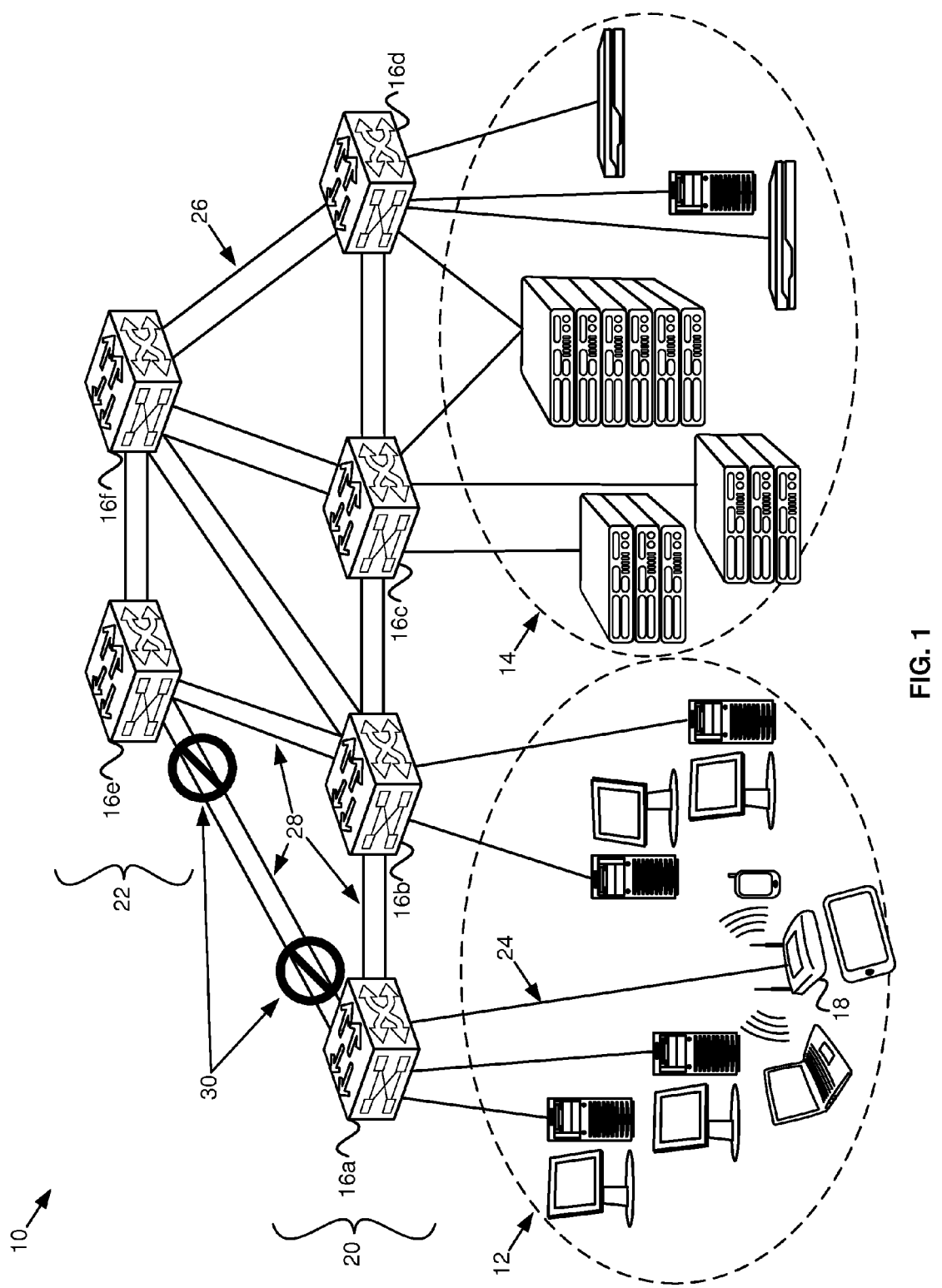
FIG. 1 is a schematic block diagram of a network with switches in accordance with an embodiment of the present invention.

Referring to FIG. 1, a network 10 is depicted with multiple nodes. These nodes may, by way of illustration and not limitation, include computing devices 12, servers 14, and switches 16. In some, but not all, examples, one or more switch may be a multi-layer switch. The computing devices 12 may include such devices as desktop computers, lap tops, smart phones, tablets, or the like. Computer devices 12, such as tablets and smart phones, may use a wireless access point 18. The computing devices 12 may access services over the network 10. Such services may be provided by servers 14 and accessed through one or more switches 16. The servers 14 may include all types of servers 14, from server racks to personal computers configured to operate as servers 14.

The switches 16 may be classified according to different categories. For example, a group of switches may be categorized as access switches 20. Another group may be categorized as aggregation switches 22. Access switches 20 may include one or more User-to-Network Interfaces (UNIs) for links 24, as indicated by the example link 24 in FIG. 1, between a switch 16 and a computing device 12. Access switches 20 and/or aggregation switches 22 may include one or more Network-to-Network Interfaces (NNI) to connect sub-networks within the network 10 together.

Switches 16 may be connected one to another over Inter-Switch Link (ISLs) 26, as indicated by the example ISL 26 in FIG. 1. The ISLs 26 are depicted as double lines to indicate that the ISLs 26 may support full duplex switching. However, half-duplex switching is also possible.

Figure 2:
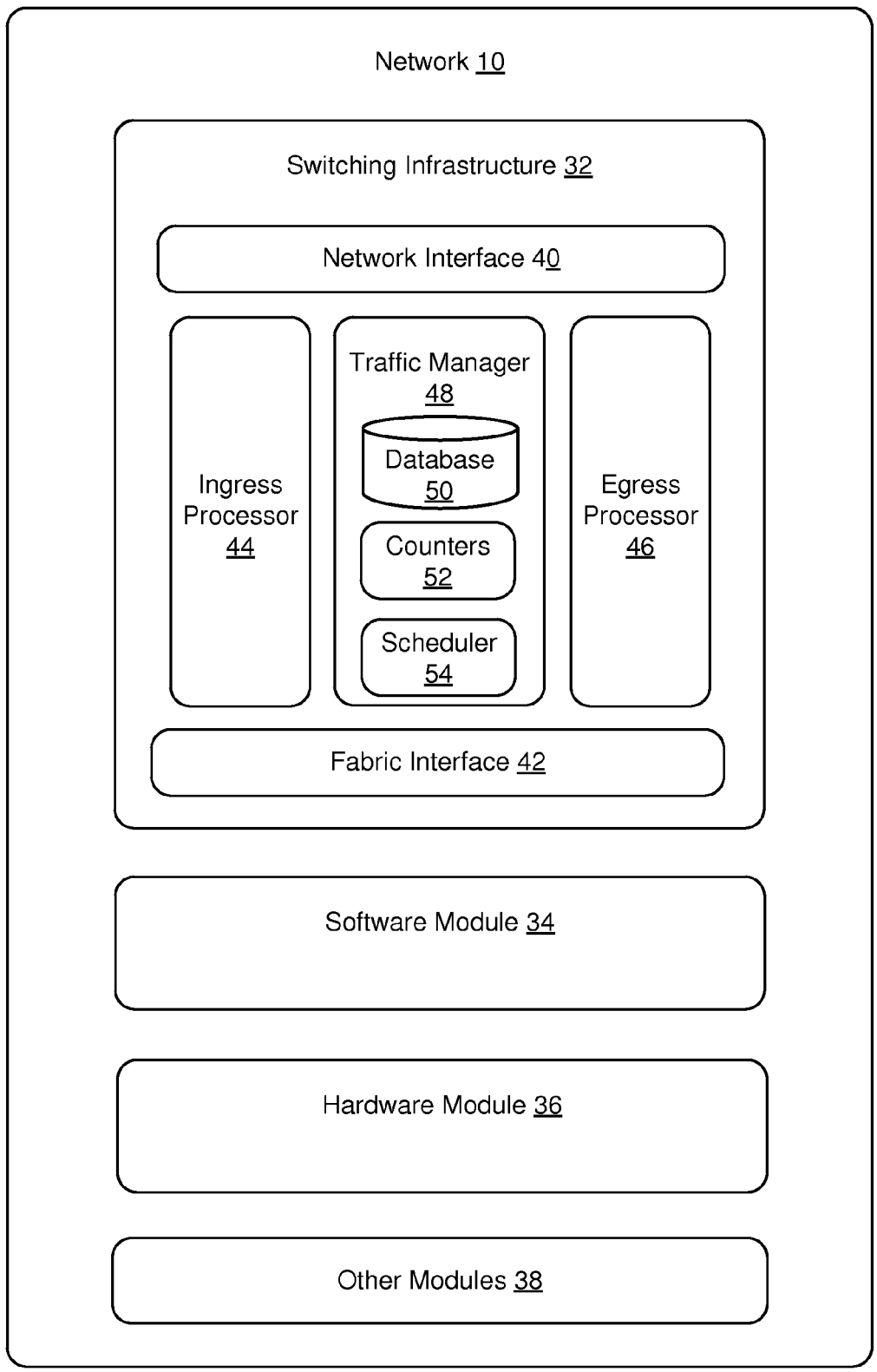
FIG. 2 is a schematic block diagram of one embodiment of a switching protection system in accordance with an embodiment of the present invention.

As can be appreciated, the ISLs 26 of the network 10 provide redundancy in terms of multiple pathways between different network nodes. However, this redundancy also results in potential loops. One example loop 28 is depicted in FIG. 2. However, these loops 28 can overwhelm network bandwidth during the flooding operations used to locate computing devices 12 and/or servers 14 within the network 10, as a result of infinitely looping calls for a new device 12 and/or server 14. Therefore, the network 10 needs to be protected against such loops 28 by blocking some links 26, as depicted in the one example of a blocked ISL 30, at certain switches 16a, 16e, while maintaining the potential to access those links 26 to maintain redundancy in the event of failure.

Protection against loops 28 is achieved through the implementation of protocols to determine which links need to be blocked and which links need to be maintained. The first of such protocols, Spanning Tree Protocol (STP), provides protection against such loops 28. However, STP may take thirty seconds or more to fully respond to a network failure. In an environment where Ethernet networks are deployed over large areas to provide services, such as voice over IP, internet access, and video on demand, such response times may be unacceptable. The ability to resolve network failures at acceptable speeds, such as speeds at which a subscriber to a given service is not able to recognize the failure, is known as survivability.

For various reasons, both real and the result of convention, the relatively short time period of fifty milliseconds has become the standard for survivability. As can be appreciated, the goal of survivability places new requirements on switching protocols, requirements which were less important for the small local area networks that connected computers in an office, as typical of the environment where Ethernet protocols were originally developed. In response to the need for decreased recovery time, additional protocols have been developed such as Rapid Spanning Tree Protocol (RSTP). Quicker still are linear and ring Ethernet protection switching protocols like International Telecommunication Union-Telecommunication Standardization Sector (ITU-T) G.8031 and ITU-T G.8032, respectively. Often, such linear and ring protection switching protocols allow for the survivability at fifty milliseconds or less.

To protect against loops 28 and failures in any number of locations in networks 10 that can take on a wide variety of topologies, these protection protocols involve complicated algorithms that lend themselves to software implementation. Additionally, software implementation can provide great flexibility through an administrator interface, upgrades and lower costs. For these and other reasons, Ethernet protection switching protocols are currently implemented in software.

However software is executed on a general purpose Central Processing Unit (CPU), slowed down by the generalized nature of the instruction set of the CPU and/or the general steps required to execute an instruction. The lag from software implementations may become more pronounced as a network 10 grows in size, causing survivability to suffer. By implementing a portion of a protocol or algorithm in hardware, the logic of the hardware can be optimized to execute the protocol or algorithm as rapidly as possible. However, completely implementing a switching protection algorithm in hardware may be overly complex, inflexible, and costly.

To protect survivability goals, thought may be invested to divide up the functions of a switch protection algorithm between software and hardware. For example, an Ethernet protection switching system, which may be implemented at least in part at a line card within a network 10, may include switching infrastructure, together with both a software module and protection hardware. Both the software and the protection hardware may effectuate control-plane changes for the network through the switching infrastructure to implement a network protection algorithm. As used herein, terms such as protection switching protocol and network protection algorithm may be used interchangeably. Both the software module and the hardware protection module may implement a change in response to one or more events that may occur in the network 10.

Implementation of the protection switching protocol may be divided between the software module and the protection hardware in terms of changes to be effected in the control plane. Time-critical and/or low level operations may be assigned to protection hardware. By way of example, and not limitation, some examples of these operations may include blocking 30 and unblocking ports, generating messages to coordinate protection activities throughout the network, and/or flushing switch database entries. The protection hardware may directly implement these operations through the switching infrastructure. In some embodiments, the protection hardware can respond directly to local events and/or network messages provided by the switching infrastructure as triggers to perform such operations. Conversely, in some examples, the software module may provide a trigger to the protection hardware for one or more operations In certain examples, the software protection protocol may be implemented as a state machine. In such examples, the software module may shoulder the complexities of implementing a master state machine that pushes changes in a state variable to the protection hardware in a master/slave relationship, where the software controls the overall state. In some of such embodiments, the protection hardware may update the software with respect to the operations it performs. These updates may be used by the software to update the state machine. Additionally, in some embodiments, the state may be set by a command from an administrator through an administrator command interface. In some embodiments, the actions taken by the protection hardware may be informed by a role played in the protection switching protocol by a network point, such as a line card, on which the protection hardware resides.

Embodiments, or aspects thereof, in accordance with the present invention may be embodied as an apparatus (system), method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "module" or "system." Aspects that have an entirely hardware embodiment can be referred to as a "module," a "system," or "circuitry." Furthermore, aspects of the present invention may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Aspects of embodiments may also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that may be rapidly provisioned via virtualization and released with minimal management effort or service provider interaction, and then called accordingly. A cloud model may be composed of various characteristics (e.g., on-demand self-service, broad network access, resource pooling, rapid elasticity, measured service, etc.), service models (e.g., Software as a Service ("SaaS"), Platform as a Service ("PaaA"), Infrastructure as a Service ("IaaS"), and deployment models (e.g., private cloud, community cloud, public cloud, hybrid cloud, etc.). Further discussion of the way in which modules, software, hardware, and other infrastructure may be combined in examples is provided below with reference to the following figures.

Referring to FIG. 2, a network 10 in accordance with the present invention may provide improved speed for protection switching protocols by implementing such protocols with switching infrastructure 32, together with one or more instances of both a software module 34 and protection hardware 36 within the network 10. Depending on the embodiment, switching infrastructure 32, a software module 34, and/or protection hardware 36 may reside at a single location in the network 10, such as on a single line card, or be distributed across the network 10. Where the switching infrastructure 32, a software module 34, and/or protection hardware 36 are contained at a single location, such as on a single line card, multiple instances of the switching infrastructure 32, the software module 34, and/or the protection hardware 36 may be implemented on within the network 10. One or more additional modules 38 may be included in the network 10 to perform functions related to the implementation of an Ethernet protection switching system.

The switching infrastructure 32, which may reside at a single location, such as a line card, or be distributed on multiple platforms, may be operable to perform switching operations. Where an instance of the switching infrastructure 32 resides at a line card, the switching infrastructure 32 may perform the switching functions for the line card. By way of example, such operations, which may also be understood in terms of functions, may include interfacing with the network, interfacing with switch fabric, packet processing (as used herein, the term frame may be used to refer to a packet of data and vice versa), and/or traffic management.

Receiving and transmitting frames, or packets, may be accomplished over different ports by means of a network interface 40 and/or a fiber interface 42. Packet, or frame, processing may be accomplished, in some embodiments, by means of a separate ingress processor 44 and egress processor 46, which may further be subdivided in terms of transmit and receive operations. The ingress processor 44 may inspect data packets/frames and determine a destination MAC address of data packets/frames and/or the presence of information in a network message used to coordinate implementation of the protection switching protocol between different locations in the network 10.

The egress processor 46 may encapsulate a data frame for distribution, including a network message generated at the line card where the switching infrastructure 32 resides. Either the ingress processor 44, the egress processor 46, or both may be associated with a buffer. In some embodiments, the ingress processor may communicate with Dynamic Random Access Memory (DRAM) through a DRAM interface to buffer frames.

The switching infrastructure 32 may include a traffic manager 48 module to direct traffic. The traffic manager 48 may include memory storing a database 50, or switch database 50, with learned entries associating different destination MAC addresses with different ports. The database, or switch database, 50 with learned entries may store a switch table, MAC table, Content Addressable Memory (CAM) table, or the like. Additionally, the traffic manager 48 may include one or more counters/timers 52 and a scheduler 54, used to schedule placement of frames on different ports through the network interface 40 and/or the fabric interface 42.

The switching infrastructure 32 may be implemented on multiple chips or on a single chip. By way of example, and without limitation, the switching infrastructure 32 may be implemented as the first and third stages of a three-stage switching approach, or in terms of a single-stage switching approach. By way of example, the BROADCOM BCM88650 Series exemplifies, without limitation, a single-chip implementation approach.

The software module 34, which may reside at a single point in the network 10, such as a line card, or be distributed across the network 10, may be programmed to implement a protection switching protocol, or network protection protocol, or aspects thereof. In implementing the protection software protocol, the software module 34 may effectuate a software-driven, one or more control-plane changes for the network. As used herein, the language discussing the effectuation of control-plane changes may refer to directly effectuating such a change and/or facilitating such a change indirectly through an intermediate step within a processes bring about such a change. For example, the software module 34 may effectuate the control-plane change by coordinating with the network through the switching infrastructure 32.

Hence, the software module 34 may receive, relay, generate, or process a network message with information relevant to protecting the network. Additionally, the software module 34 may adapt the switching infrastructure 32 to effectuate the control-plane change. The software module 34 may effectuate a change in response to one or more events taking place locally, such as at a line card on which the software module 34 resides, and/or remotely within the network 10. In other words, the software module 34 may be programmed to respond to events obtainable in the network 10.

The software module 34 may be programmed to respond to a first subset of potential control-plane actions for the network 10, in response to a set of events obtainable in the network 10, in accordance with a protection switching protocol, i.e., network protection protocol. As used herein, the terms set and subset may include any number of elements, including a single element. The first subset of potential control-plane actions may be separate and apart from a second subset of potential control-plane actions designated for implementation by the protection hardware 36. Additionally, further modules and functionalities associated with the software module 34 are discussed below.

The protection hardware 36 may be communicatively coupled to the switching infrastructure 32. Additionally, the protection hardware 36 may be wired to effectuate one or more hardware-driven, control-plane changes. The control-plane changes that the protection hardware 36 may be wired to implement, or effectuate, may come from a second subset of potential control-plane actions that may be implemented in accordance with the network protection protocol. The second subset of potential control-plane actions may include low-level operations that lend themselves to hardware implementation, time-critical operations, and/or repetitive operations, among other potential categories by which such operations may be classified. Non-limiting examples of such control-plane changes may include, without limitation, blocking 30 and unblocking ports, generating messages to coordinate protection activities throughout the network, and/or flushing switch database entries.

The protection hardware 36 may effectuate, or implement, control-plane changes by means of dedicated logic circuitry. The dedicated logic circuitry may be operable at aggregate speeds quicker than those achievable by the software module 34. The protection hardware 36 may implement, or effectuate, a control-plane change by being wired to coordinate with the network 10 to facilitate the control-plane change. The protection hardware 16 may coordinate with the network 10 by receiving, relaying, generating, or processing a network message with information relevant to protecting the 10 network. To effectuate a control-plane change, the protection hardware 36 may adapt the switching infrastructure 32. For example, and without limitation, the protection hardware 36 may block 20 or unblock ports and/or flush entries from a switch table.

The protection hardware 36 may effectuate a change in response to one or more events taking place locally, such as at a line card on which the protection hardware 36 resides, and/or remotely within the network 10. In other words, the protection hardware 36 may be wired to respond to events obtainable in the network 36. Additional functionalities and/or modules associated with the protection hardware 36 will be discussed below.

Figure 3:
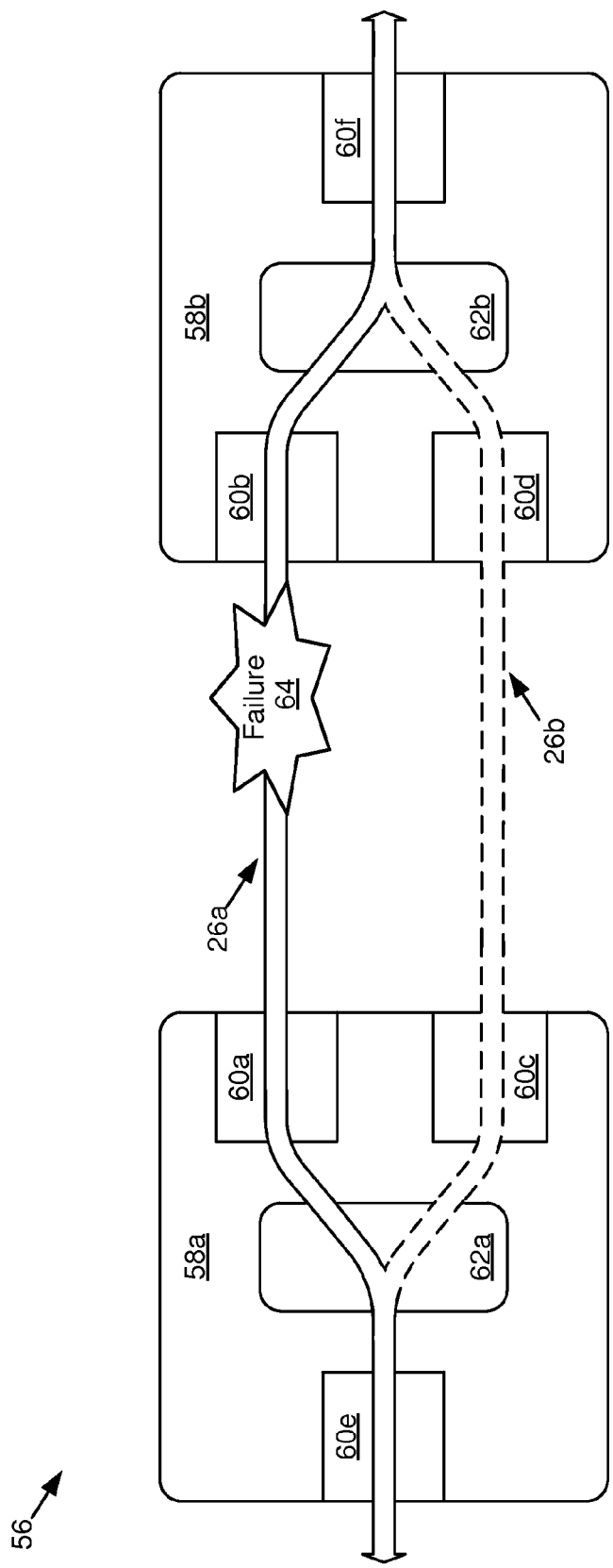
FIG. 3 is a schematic block diagram of a linear switching protection system, in accordance with an embodiment of the present invention.

Referring to FIG. 3, basic topology and operation of a linear switching protection protocol 56 is depicted with the aid of a schematic block diagram. A first node 58*a* and a second node 58*b* may maintain a pair of bi-directional links 26 between them, which may or may not be ISLs 26. The pair of nodes 58 may maintain a first link 26*a* of the link pair between a first Ethernet-network-layer flow point (ETH_FP) 60*a* in the first node 58*a* and a second ETH_FP 60*b* in the second node 58*b*. (In certain embodiments, an ETH_FP may be implemented with a line card). Similarly, the pair of nodes 58 may also maintain a second link 26*b* of the link pair between a third ETH_FP 60*c* in the first node 58*a* and a fourth ETH_FP 60*d* in a second node 60*b*.

As can be appreciated, the pair of links 26 provide redundancy, but, because of their bi-directional nature, could also be involved in a problematic loop 28. The linear switching protection protocol 56 may avoid problems associated with loops 28 through different architectures, such as a 1+1 architecture and a 1:1 architecture. The linear protection protocol 56 may designate one link 26*a* in the pair of links, such as the first link 26*a* in FIG. 3, as the working link 26*a*, also referred to as the working transport entity 26*a*. The protocol 56 may designate the second link 26*b* as the protection link 26*b*, also referred to as the protection transport entity.

In the 1+1 architecture, the first node 58*a*, acting as a source node 58*a*, may, by means of a first bridge 62*a* copy and feed normal traffic, received from a fifth ETH_FP 60e, onto both the working link 26a and the protection link 26b. After simultaneous transmission, a second bridge 62b at the second node 58b, acting as the sink node 58b, may select the transmission from one of the pair of links 26 to communicate to a sixth ETH_FP 60f for egress from the second node 58b. The 1+1 architecture prevents loops because, although traffic is communicated over two different physical paths, the same traffic is communicated as if there were only a single path. However, by using two physical paths, the 1+1 architecture preserves redundancy, since, in the event of a failure 64 on one link 26a, such as the working link 26a, the second link 26b may still communicate the traffic.

In the 1:1 architecture, the first bridge 62a on the first node 58a, acting as a source node 58a, may determine whether the normal traffic from the fifth ETH_FP 60e is transmitted on either the working link 26a or the protection link 26b. By default, the first node 58a may transmit normal traffic on the working link 26a. In the event of a failure 64 on the working link 26a, the first node may transmit the normal traffic on the protection link 26b. The second bridge 62b at the second node 58b then may select the link 26 carrying the normal traffic, either the working link 26a by default, or the protection link 26b in the event of a failure 64. Again, a single logical link avoids the potential for a loop 28, while a backup link 26b preserves redundancy.

One, non-limiting example of a linear protection switching protocol may be found in ITU-T G.8031, however, other linear protection switching protocols are possible. Implementation of such architectures requires coordination and re-configurations to the control plain of a network 10. Such changes may be effectuated, and/or implemented, by a combination of one or more software modules 34 and one or more instances of protection hardware 36 via switching infrastructure 32 at the nodes 58. Examples of such control plane changes will be discussed below with respect to another example of a protection switching protocol, i.e., a ring switching protection protocol, with the aid of the following figure.

Figure 4:
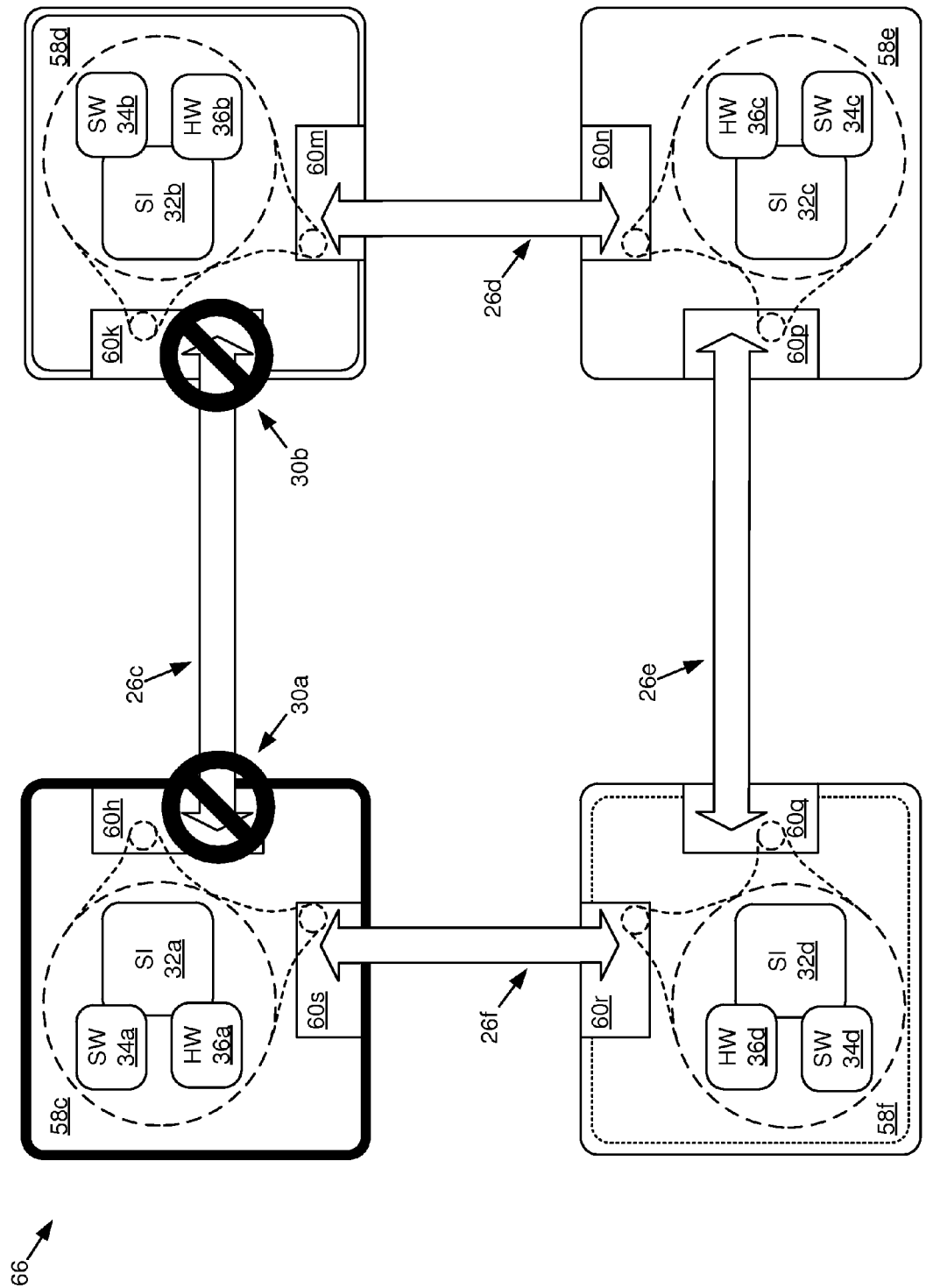
FIG. 4 is a schematic block diagram of a ring switching protection system, in accordance with an embodiment of the present invention.

Referring to FIG. 4, basic topology and operation of a ring switching protection protocol 66 is depicted with the aid of a schematic block diagram. Four nodes 58c-58f may be involved in implementing a ring switching protection protocol 66. However, many different numbers of nodes 58 may be involved. A series of different links 26c-26f, which may be ISLs 26c-26f, are depicted between the four nodes 58c-58f to form a ring.

A first link 26c may be formed between a first ETH_FP 60h at the first node 58c and a second ETH_FP 60k at the second node 58d. Similarly, a second link 26d may be formed between a third ETH_FP 60m and a fourth ETH_FP 60n at the second and third nodes 58d, 58e respectively; a third link 26e may be formed between a fifth ETH_FP 60p and a sixth ETH_FP 60q, at the third 58e and fourth 58f nodes respectively; and, a fourth link 26f may be formed between a seventh ETH_FP 60r and an eighth ETH_FP 60s, at the fourth 58f and first 58c nodes respectively. As may be appreciated from FIG. 4, the links 26c-26f may be bidirectional. Also, in some examples, one or more of the ETH_FPs 60h-60s may be implemented on line cards.

As can be appreciated, the ring structure resulting from the four links 26c-26f between the four nodes 58c-58f can provide redundancy. At the same time, the ring structure may also result in a problematic loop 28. Although not depicted, potential links between the first node 58c and the third node 58e and the second node 58d and the fourth node 58f could also create problematic loops 28. However, for purposes of clarity, only the four nodes 58c-58f with the four links 26c-26f depicted between them in FIG. 4 are considered.

To avoid loops 28, a ring switching protection protocol 66 may designate a particular link 26c as a Ring Protection Link (RPL) 26c. Although the first 58c and the second 58d nodes may maintain the RPL 26c, the RPL 26c may be blocked 30, preventing loop 28 problems. By maintaining the blocked 30 RPL 26c, redundancy may be preserved. In the event of a failure 64 at another link 26, the blocks 30a, 30b at the RPL 26c may be removed. Although blocking 30 and unblocking an RPL 26c to prevent loops 28 while maintaining redundancy in response to events in the abstract is straightforward, actual implementation may involve additional details and the performance of complicated operations.

For example, a first node 58c involved in maintaining the RPL 26c may be designated as an Owner RPL (ORPL) 58c. In FIG. 4, the ORPL 58c is indicated by the bold border outline. Specific functions related to blocking 30a and unblocking and/or initiating the blocking 30a and unblocking of the RPL 26c may be assigned and performed on the basis of a node's 58c status as an ORPL 58c. Similarly, specific functions related to blocking 30b and unblocking and/or coordinating the blocking 30a and unblocking of the RPL 26c may be assigned and performed on the basis of a node's 58d status as a neighbor RPL node 58d. In FIG. 4, an example neighbor RPL node 58d is indicated by the double-lined border outline. Additionally, specific functions may be assigned to an adjacent node 58f, which shares a link 26f with the ORPL node 58c other than the RPL 26c. An example adjacent node 58f is indicated by a node 58f with a double-line border outline with a dotted line on the interior in FIG. 4.

For example, in some embodiments, protection hardware 36 may be wired to coordinate with the network 10 and/or adapt the switching infrastructure 36 based on a role played by a link 24/26 associated with a node 58, ETH_FP 60, or line card, in a network protection protocol to effectuate the hardware-driven, control-plane change in response to an event in the network 10. Therefore, in some examples, implementation of a network protection protocol may involve referencing a relative position of a flow point 60 in the network implemented on the line card. Such implementations may further involve determining a need for the control-plane change in response to both the relative position of the flow point 60 in the network 10 and network protection information, such as information about network protection events.

Each node 58c-58f may be implemented to include switching infrastructure 32a-32d capable of performing switching functions. Blocking 30 and unblocking the RPL 26c at appropriate times in response to events in a network 10 and in accordance with a ring switching protection protocol 66 may involve changes at the control-plane level that may be implemented in and/or coordinated through switching infrastructure 32 by a software module 34 and/or protection hardware 36, in accordance with the ring switching protection protocol 66. Therefore, one or more nodes 58c-58f may include a software module 34a-34d and/or protection hardware 36a-36d.

In some embodiments, switching infrastructure 32, a software module 34, and/or protection hardware 36 at a given node 58 may be distributed across the node 58. Also, in some embodiments, individual instances of switching infrastructure 32, a software module 34, and/or protection hardware 36 may be provided at one or more individual ETH_FPs 60 at the given node. For example, in embodiments where one or more ETH_FPs 60 are implemented individually on one or more line cards, a separate instance of switching infrastructure 32, a software module 34, and/or protection hardware 36 may reside at an individual line card. Similar comments may be applicable to nodes 58a, 58b in a linear protection switching protocol 56.

One, non-limiting example of a ring protection switching protocol 66 may be found in ITU-T G.8032, which may provide additional details. Also, the ring protection switching protocol 66 may or may not support a multi-ring/ladder network 10. Although FIG. 4 is helpful to depict the relationships between elements in a ring protection switching protocol 66, actual operations on and through switching infrastructure 32, as may be implemented by one or more software modules 34 and/or instances of protection hardware 36 remain transparent. To introduce examples of such operations, a procedural approach is taken in the following figure.

Figure 5:
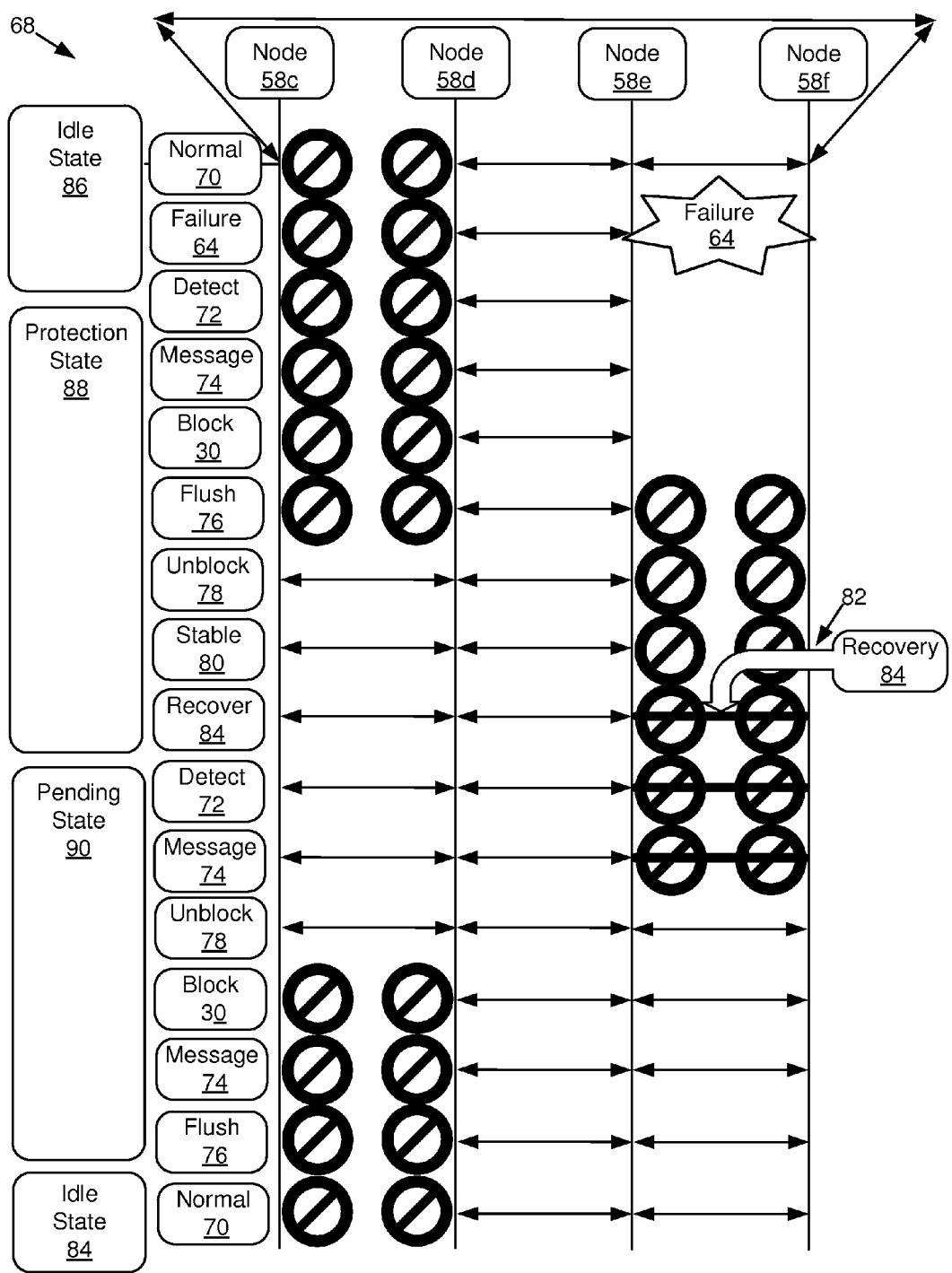
FIG. 5 is a schematic block diagram of steps involved in failure recovery and revertive processes in a ring switching protection protocol, in accordance with an embodiment of the present invention.

Referring to FIG. 5, example failure response 68 and revertive 82 processes in accordance with a ring protection switching protocol 66 are depicted with a schematic block diagram. As in the previous figure, four nodes 58a-58d may be involved, with active, bidirectional links 26, depicted by the two-sided arrows. However, a problematic loop 28 may be avoided by blocking 30 operations that may be carried out by two nodes 58c, 58c with respect to an RPL 26c during normal operation 70.

As time progresses, however, a failure event 64 may occur at another link 26e between two additional nodes 58e, 58f, initiating a failure response process 68. A first step in harnessing the redundancy between the nodes 58c-58f may involve detection 72 by adjacent nodes 58e, 58f of the failure 64. By way of example and not limitation, a failure 64 may include one or more of the various defects defined in ITU-T G.8032. To detect 72 a failure 64, one or more nodes 58, and/or individual ETH_FPs 60 related to those nodes 58, which may be implemented on line cards, may engage in one or more monitoring activities, such as, by way of example and not limitation: referencing the status of the underlying server layer trail; engaging in Tandem Connection Monitoring (TCM); and/or setting up an extra test trail on a link 26.

After adjacent nodes 58e, 58f detect 72 a failure 64, the adjacent nodes 58e, 58f, and/or individual ETH_FPs 60 related to those nodes 58e, 58f, may wait on a hold-off time indicated by a counter 52 and then begin to respond to the failure 64. Messaging 74 may also begin at the adjacent nodes 58e, 58f to coordinate a response. The adjacent nodes 58e, 58f, and/or individual ETH_FPs 60 related to those nodes 58e, 58f, may block 30 ports on either side of the failed link 26e. The adjacent nodes 58e, 58f, and/or individual ETH_FPs 60 related to those nodes 58e, 58f, which may be implemented on line cards, may also engage in a flush operation 76. A flush operation 76 may involve removing one or more learned entries from a switch table, MAC table, CAM table, or the like, maintained in one or more switch databases 50 maintained by switching infrastructure 32 to prevent the direction of frames by the switching architecture over one or more links 26 where a failure 64 may have occurred. By way of example and not limitation, additional detail for one form of flush operation may be found in connection with the learning, forwarding, and filtering database (FDB) flush 76 as defined in ITU-T G.8032.

Furthermore, the adjacent nodes 58e, 58f, and/or individual ETH_FPs 60 related to those nodes 58e, 58f, which may be implemented on line cards, may generate one or more network messages. A network message may carry a wide variety of types of information relevant to coordinating the implementation of a ring protection switching protocol 66 in a network, such as information about events occurring in a network 10, conditions in the network 10, and/or commands, relevant to implementing the protection switching protocol 66. By way of example and not limitation, a network message may be consistent with a Ring-Automatic Switch Protection (R-ASP) message, or the like. Additional nodes 58 may also become involved in messaging 74 by relying on one or more network messages. Upon receiving a network message, additional nodes 58 may also perform a flush operation 76. Such operations may be informed, by way of example, and not limitation, using a node ID and/or Blocked Port Reference (BPR) in the network message.

Upon receiving a network message with information relevant to a failure 64, the ORPL node 58c and/or the neighbor node 58d, and/or individual ETH_FPs 60 related to those nodes 58e, 58f, which may be implemented on line cards, may unblock 78 ports associated with the RPL 26c. Once the RPL 26c is unblocked 78, a stable condition 80 may be realized across the network 10, pursuant to which traffic may continue to flow to all nodes 58 without problems associated with loops 28.

The stable condition 80 is not the normal condition 70, however, and is somewhat compromised because since the RPL 26c may already be carrying traffic, there is no RPL to fall back on. Therefore, there are advantages to reverting to the normal condition 70 by means of a revertive process 82. The revertive process 82 may proceed once recovery 84 occurs at the previously failed link 26e. Again, detection 72 by the adjacent nodes 58e, 58f, and/or individual ETH_FPs 60 related to those nodes 58e, 58f, may be involved. Additionally, a guard timer 52b may be initiated before unblocking 78 the previously failed link 26e. A process of periodic messaging 74 may begin. The ORPL node 58c may also initiate a restore timer 52c in response to a network message. At the conclusion of the guard timer 52b, the adjacent nodes 58e, 58f, and/or individual ETH_FPs 60 related to those nodes 58e, 58f, may unblock ports 78 at the previously failed link 26e. At the conclusion of the restore timer 52c, the ORPL node 58c and/or the neighbor node 58d may block 30 ports to the RPL 26c. Additional messaging 74 may facilitate flush operations 76 to alter the control plane so that the normal condition 70 is restored.

For purposes of implementation by means of a state machine, the various operations and conditions involved in the foregoing processes may be associated with various states. Certain operations and conditions may be associated with an idle state 86 which may be triggered into another state, a protection state 88, by an operation or condition, such as detection 72 of a failure 64. The detection 72 of recovery 84 may trigger yet another state, a pending state 90, which in turn may yield back to the idle state 86 with the return of the normal condition 70. Several additional states, some of which are discussed below, are possible in relation to additional processes. Similar operations, events, and/or states, or the like could be described with respect to other network protection protocols, such as a linear switch protection protocol.

Figure 6:
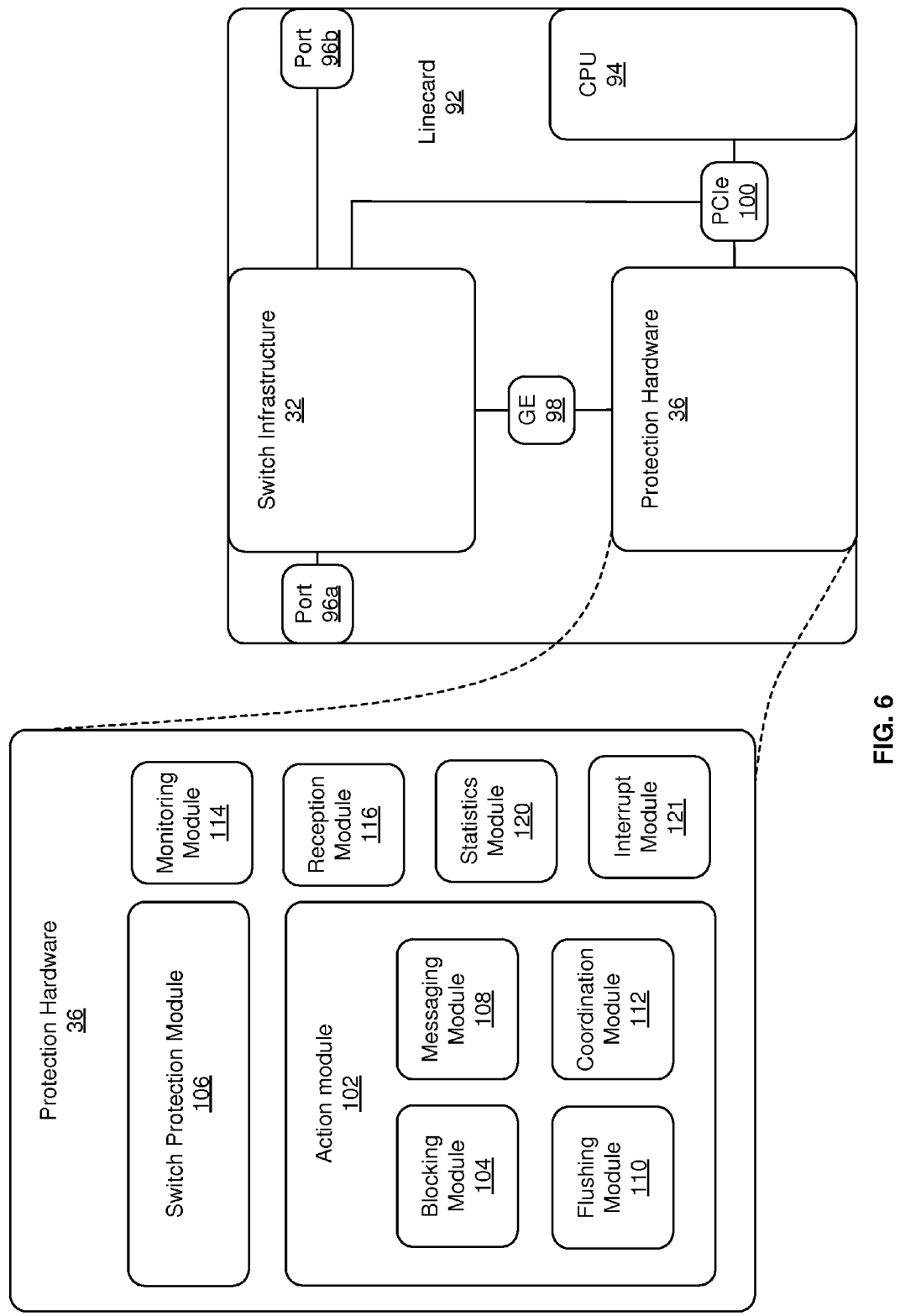
FIG. 6 is a schematic block diagram of a line card with switching infrastructure, protection hardware, a central processing unit, and ports, with additional modules and/or circuitry within the protection hardware, in accordance with an embodiment of the present invention.

Referring to FIG. 6, a line card 92 may be deployed together with an instance of protection hardware 36 with various modules and/or circuitry to implement aspects of a switching protection protocol. From the foregoing discussion, various switching protection protocols are possible. Regardless of the protocol, however, as apparent from the discussion of the preceding figure, implementation of processes associated with such a protocol may require several operations using and/or updating switching infrastructure 32 to make control-plane changes associated with a protection switching protocol.

A line card 92 may be used to implement a node 58 and/or an ETH_FP 60 at a node 58 within a network 10. In addition to an instance of protection hardware 36, a line card 92 may be implemented with an instance of switch infrastructure 32 and/or a CPU 94. Additionally, the line card may have one or more ports 96 controlled by the switching infrastructure 32 over which links 24/26 within a network 10 may be maintained. A port 96 on the line card 92 may be configurable to send and to receive a frame with a destination MAC address.

The Protection Hardware 36 may be communicatively coupled to the switch infrastructure 32. By way of example and not limitation, the protection hardware 36 may be communicatively coupled 98 to the switch infrastructure 32, by means of an interface supportive of Gigabit Ethernet (GE), such as Serial Gigabit Media Independent Interface (SGMII), but other forms of communication link are possible. Additionally, the communication pathway 98 between the protection hardware 36 and the switch infrastructure 32, may include, or alternatively be realized by, a Peripheral Component Interconnect Express (PCIe) bus. Additional interfaces, or alternatives, may also be used to establish the communication pathway 98. Also by way of explanation and not limitation, the CPU 94 may be communicatively coupled to the switch infrastructure 32 and/or the instance of protection hardware 36 by means of a PCIe bus. The CPU 94 may also be communicatively coupled to a software module 34. Again, other forms of communication link, and combinations thereof, are possible.

The instance of switching infrastructure 32 may be provided with any of the elements discussed herein and/or enabled to perform any of the functions discussed herein. The CPU 94 may provide a generalized instructions set and generalized steps for executing such instructions. The CPU 94 may execute operations of a software module 34 programmed to implement aspects of a protection switching protocol. The flexibility of such a software module may lend itself to controlling the complexities of a protection software protocol. However, implementation of aspects of a protection software protocol may be slowed down due to the nature of software and/or the generalized nature of the CPU 94 used to execute the software.

As discussed, lags associated with software implementation of protection switching protocols may be problematic in a service providing network 10, where survivability, or quick recovery times, are desirable. These problems may become increasingly troubling as a network 10 grows in size. Therefore, as also discussed above, aspects of the protection switching protocol may be implemented on protection hardware 36. Such aspects may include a subset of potential control-plane changes/actions and/or network alterations, including intermediate steps used to implement those control-plane changes and/or network alterations. Candidates that lend themselves for implementation on the protection hardware 36 may include, without limitation, low level, time-critical, and/or repetitive operations.

Coordination between the software module 34 and the protection hardware 36 may facilitate implementation of a network protocol via both the software module 34 and the protection hardware 36. For example, the protection hardware may include an interrupt module 121. The interrupt module 121 may be wired to interrupt CPU 94 upon performance of an action to facilitate a control-plane change in the network.

To implement actions to effectuate, or implement, the network protection protocol, the protection hardware 36 may be provided with an action module/circuitry 102. As discussed previously, with respect to the protection hardware 36, a module may be implemented as circuitry and aspects of the protection hardware 36 may be referred to as modules and/or circuitry. The action module/circuitry 102 may be dedicated to interface with the switching infrastructure 32 of the line card 92 to implement a time-critical network alteration quickly through dedicated circuit pathways in the protection hardware. The action module 102 may respond to the need for the control-plane change with optimized and dedicated circuitry in the protection hardware 36. This circuitry may be wired to interface with switching infrastructure 32 on the line card 92 to alter the control plane of the network 10.

Such circuit pathways may be implemented on a Field Programmable Gate Array (FPGA). Indeed, the entire protection hardware 36 may be implemented on an FPGA, or simply one or more aspects of the protection hardware 36. However, additional circuitry-based alternatives for the protection hardware 36 are also possible.

The action module/circuitry 102 may include additional modules/circuitry to effectuate, or implement, control-plane changes and/or network alterations. For example, the action module/circuitry 102, or the protection hardware 36 generally, may include a blocking module/circuitry 104. The blocking module/circuitry 104 may be wired to access a set of internal registers within the switching infrastructure 32 operable both to block 30 and to unblock 78 a port 96. The set of internal registers may be directly accessible by the protection hardware 36. The blocking module/circuitry 104 may be wired to access the set of internal registers to block 30 and to unblock 78 the port 96 in response to different events to effectuate a hardware-driven, control-plane change.

In another example, the blocking circuitry 104 may be wired to control registers in the switching infrastructure 36 that block and unblock a line-side interface. A line-side interface may communicate with another node 58 in the network 10 via a network interface 40 as opposed to a fabric interface 42. The line-side interface may be configured to send and receive frames with a destination MAC address in response to a time-critical network alteration. The need for such a network alternation may be determined by switch protection circuitry 106 in the protection hardware 36.

Additionally, the action module/circuitry 102, or the protection hardware 36 generally, may include a messaging module/messaging circuitry 108. The messaging module 108 within the protection hardware 36 may be wired to generate a message, such as a network message as discussed herein, for distribution to the network 10. The messaging module 108 may use the switching infrastructure 32 to distribute the message. Furthermore, the messaging module 108 may generate the message in response to an event to effectuate the hardware-driven, control-plane change in accordance with a network protection protocol.

Such messages may include information to communicate aspects of the processes 68, 82 discussed above, in addition to the communication of other information, events, operations, and conditions that may obtain in a network 10 relevant to a network protection protocol. For example, such a message may communicate detection of a link failure 64 and/or link recovery 64, and may include a node identification and/or an ETH_FP reference related to the failure 64 and/or recovery 84. Such a message may communicate a need to perform a flush 76, block 30, and/or unblock 78 operation. The message may be implemented as an R-APS message, or the like. Additional details relating to the implementation of the messaging circuitry 108 are discussed in the following figure.

Furthermore, the action module/circuitry 102, or the protection hardware 36 generally, may include a flushing module/flushing circuitry 110 and/or a coordination module/coordination circuitry 112. The flushing module 110 within the protection hardware 36 may be in communication with the switch database 50 in the switching infrastructure 32. Furthermore, the flushing module 110 may be wired to flush 76 a set of learned entries from the switch database 50 in response to an event in the network 10 to effectuate the hardware-driven, control-plane change.

As discussed above, the switch database 50 within the switching infrastructure 36 may be used by the switching infrastructure 36 to perform switching functions based on learned entries. The flushing circuitry 110 may be wired to flush a set of learned entries from the switch database 50, thereby altering the network topology. The flushing circuitry 110 may alter the switch database 50 stored in memory of the switching infrastructure 36 in response to a time-critical network alteration determined by the switch protection circuitry 106. Furthermore, the set of learned entries may be informed by a network message, and or a local event. By way of example and not limitation, the set of learned entries may be informed by a node identification and/or ETH_FP reference related to link failure 64 and/or link recovery 84 in a network message.

The protection hardware 36 may include switch protection circuitry 106. The switch protection circuitry 106 may be dedicated to determine a need for a time-critical network alteration from a protection event received through at least one of monitoring circuitry 114 and reception circuitry 116 on the protection hardware 32. The switch protection circuitry 106 may make such a determination based on one or more events independent of the software module 34. The switch protection circuitry 106 may be wired to determine a need for a time-critical network alteration based on a network protection protocol that is a linear protection switching protocol, a ring protection switching protocol, or the like. By means of the switch protection circuitry 106, analyzing the protection information with circuitry in the protection hardware 36 may be accomplished. Also, such circuitry may be optimized and dedicated to determine a need for a control-plane change to protect the network 10 with improved efficiency and/or speed.

The monitoring module/circuitry 114 may reside within protection hardware 36 on a line card 92 situated in a network 10. The monitoring circuitry 114 may be dedicated to monitor for a protection event at the line card 92. Non-limiting examples of such protection events may include a failure 64 and/or recovery 84 at a link 24, 26 maintained at a port 96 of the line card 92.

The reception module/circuitry 116 within the protection hardware 36 may be dedicated to receive a protection message, or network message, dropped to the protection hardware 36 from switching infrastructure 32 at the line card 92. Such a message may originate remotely within the network 10 and report on a protection event, such as those discussed above. By means of the monitoring module 114 and/or the reception module 116, protection information may be provisioned to protection hardware 36 within a line card 92.

The operations of the reception circuitry 116 and other modules and circuitry discussed herein may be associated with the generation of and access to statistical information about the network 10. Therefore, the protection hardware 36 may include a statistics module 118 wired to collect additional statistical information as the protection hardware 36 operates. Additional modules, such as the coordination module 112 and the interrupt module 120 will be discussed below in connection with additional figures.

Figure 7:
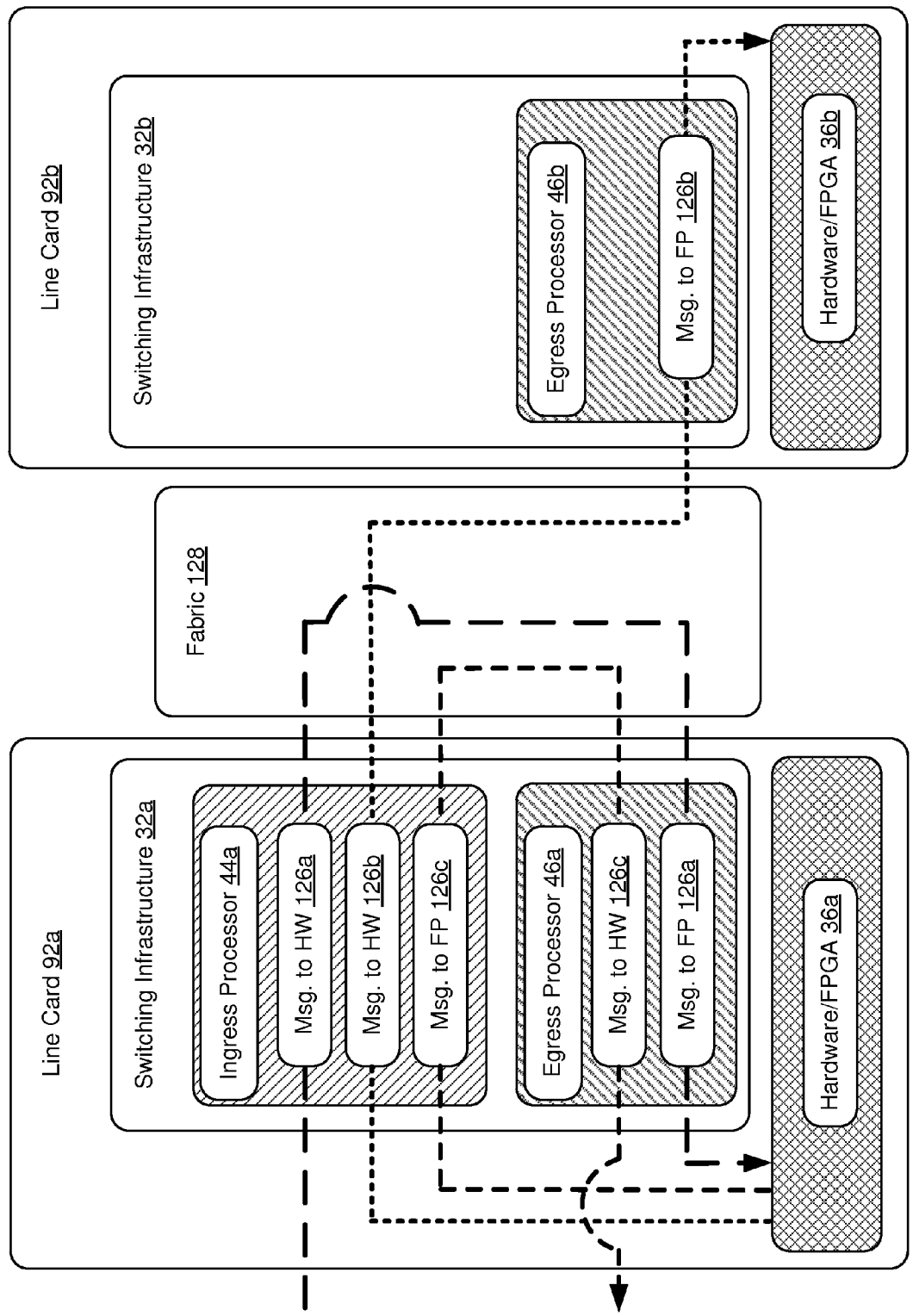
FIG. 7 is a schematic block diagram of an ingress processor on a line card and the egress processors on two line cards that facilitate reception of network messages by protection hardware and the distribution of network messages generated by protection hardware, in accordance with an embodiment of the present invention.

Referring to FIG. 7, switching infrastructure 32 may use an ingress processor 44 and an egress processor 46 to process a message 126, to provide the message to protection hardware 36, and/or process a message 126 and distribute a message 126 generated by protection hardware 36. The message 126 may be a network message, protection event message, R-APS message, or the like. After the ingress processor 44 and/or the egress processor 46 inspect and/or encapsulate a message, switch fabric 128 may be used to direct a message 126 to the appropriate destination. The switch fabric 128 may be implemented with any number of switch-fabric architectures, from a crossbar, switch-fabric architecture to a shared-memory, switch-fabric architecture.

The switch fabric 128 may be shared by multiple line cards 92. For example, a first instance of switching infrastructure 32a, with a first instance of an ingress processor 44a and a first instance of an egress processor 46a, may reside on a first line card 92 in communication with the switch fabric 128 through a fabric interface 42 of the first instance of the switching infrastructure 36a. Similarly, a second line card 92b with a second instance of switching infrastructure 32b, with a second instance of an ingress processor 44b and a second instance of an egress processor 46b, may also be coupled with the switch fabric 128 through another fabric interface 42 in the second instance of the switching infrastructure 132b.

With respect to a first message 126a, the first message 126a may be received by the first line card 92a from another node 58 in the network 10 over a port 96 in communication with the network interface 40. The first instance of the ingress processor 144a may inspect the corresponding frame to determine that the frame embodies a message, such as a network message, protection-event message, R-APS message, or the like. Once the first message 126a is identified by inspection to embody a message relevant to a network protection protocol, the switch fabric 128 may be used to direct the first message 126, or a copy thereof, to the first instance of the egress processor 46a.

The first instance of the egress processor 46a may edit the corresponding frame to provide a copy of the first message 126a to the protection hardware 36a. In editing the first message 126a, the first instance of the egress processor 46a may generate a Protocol Data Unit (PDU) for delivery to the protection hardware 36. In generating the PDU, the first instance of the egress processor 46a may edit the first message 126a to indicate the port 96 of arrival at the line card 92. Additionally, the PDU may be configured with a field to encode a state or request a state, a field to indicate a flush request, a field to indicate whether an RPL 26c is blocked 30 or unblocked 78, a field for a node identification, a field for an ETH_FP reference, and/or one or more reserved fields. A reception module/reception circuitry 120 at the protection hardware 36 may be provided to receive and/or read the first message 126a/PDU from the first instance of the egress processor 46a.

Ingress processors 44 and/or egress processors 46 may also facilitate the distribution of messages, such as a network message, protection-event message, R-APS message, or the like. For example, messaging circuitry 108 within protection hardware 36 may be wired to generate a second control-plane message 126b destined for communication through the switch fabric 128 to a second egress processor 124b within a second instance of switching architecture 32b on a second line card 92b and ultimately to a second instance of protection hardware 36b at the second line-card 92b. The second egress processor 46b may be configured to edit the second control-plane message 126b in ways similar to those discussed above before providing a copy to the second instance of protection hardware 36b.

Similarly, the messaging circuitry 108 within the protection hardware 36 may be wired to generate a third control-plane message 126c destined for communication over a network interface 40 in the first instance of the switching infrastructure 32a. The messaging circuitry 108 may provide the third control-plane message 126c to the ingress processor 44a for communication through the switch fabric 128 to the first egress processor 46a. The first egress processor 44a may be programmed to encapsulate the third control-plane message 126c for distribution within the network 10 to coordinate a control-plane change for the network 10 in response to a time-critical network alteration determined by the switch protection circuitry 106. The encapsulated third control-plane message 126c may then be communicated through the network interface 40 to another node 58.

Figure 8:
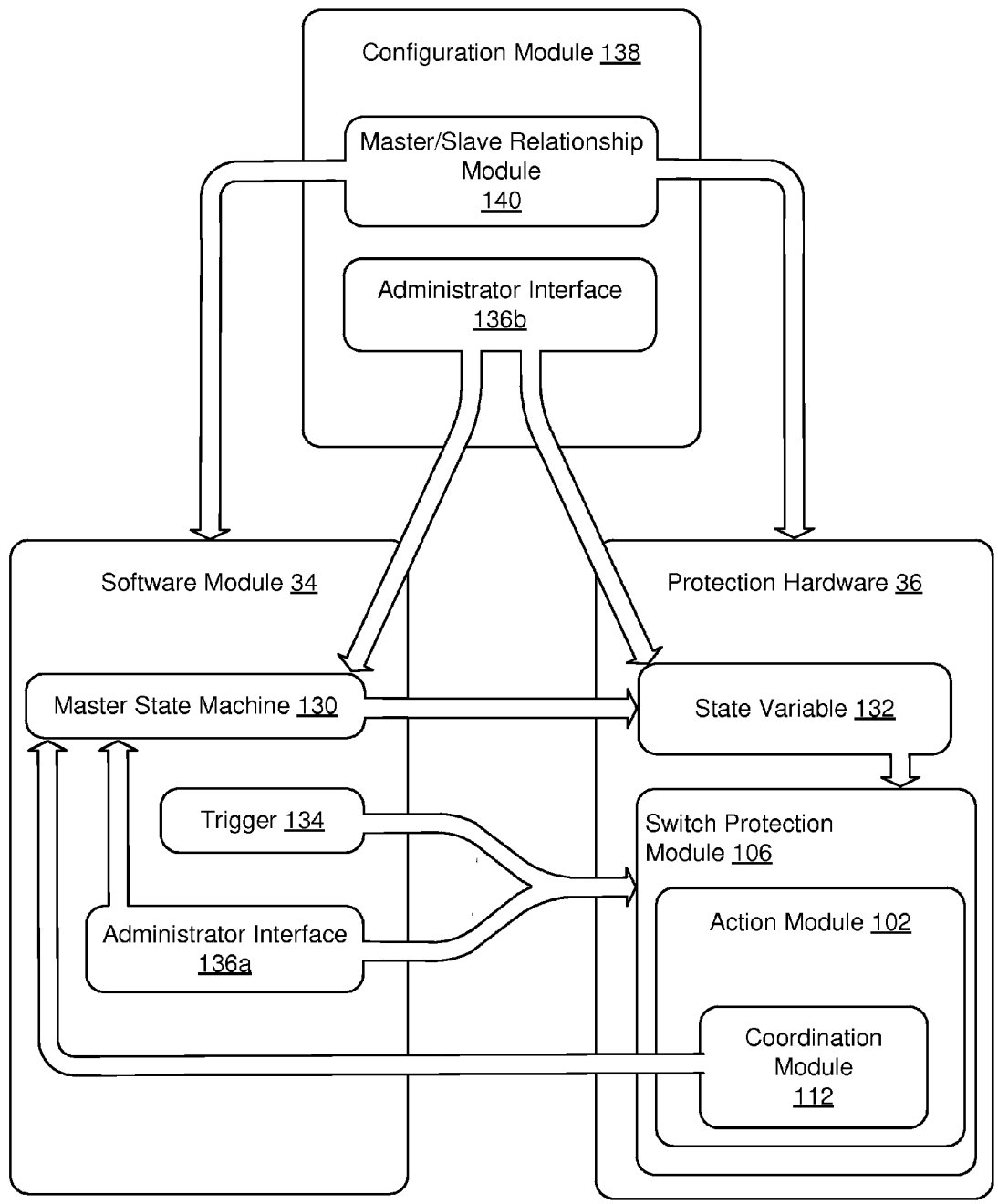
FIG. 8 is a schematic block diagram of a master/slave relationship between a software module and protection hardware involved in a state-machine implementation of a switching protection protocol, in accordance with an embodiment of the present invention.

Referring to FIG. 8, a relationship between a master state machine 130 at a software module 34 and protection hardware 36 may be used to implement a protection switching protocol, or network protection protocol in terms of a state machine. The complexities involved in network protection protocols may lend themselves to implementation as a state machine. For example, a ring protection switching protocol may be implemented in terms of a state machine, as exemplified by Table 10-2 in the specification for ITU-T G.8032.

The protection hardware 36 may maintain a state variable 132 consistent with the network protection protocol. Furthermore, the protection hardware 36 may be wired to coordinate with the network 10 and or adapt the switching infrastructure 32 in response to both a present state of the state variable 132 and an event in the network 10 in order to effectuate the hardware-driven, control-plane change consistent with the network protection protocol. However, due to the potential complexity of correctly maintaining the state of a state-machine implementation of a network protection protocol, the responsibility may be assigned to a master state machine 130 in the software module 34.

Hence, a master state machine 130 in the software module 34 may be provided consistent with the network protection protocol. Furthermore, the master state machine 130 may control the state variable 132 maintained in the protection hardware 36 in a master/slave relationship. Therefore, the master state machine 130 may push a change of state at the master state machine 130 to the state variable 132 in the protection hardware 36.

A determination to take an action to effectuate a control-plane change may be made by the switch protection module 106 based in whole or in part on the state variable 132. A determination to take such an action may be realized by the action module 102. A coordination module 112 within the protection hardware 36 may be wired to provide an update of an action taken by the protection hardware 36 to the master state machine 130 of the software module 34. The software module 34, which may include the master state machine 130 itself, may amend the present state of the master state machine 130 based on the update. Any amendment to the present state of the master state machine 130 may be in accordance with the network protection protocol. In other words, the coordination module 102 may coordinate a control-plane change with the software module 34 programmed to also make control-plane changes in response to network protection information.

In some embodiments, the software module 34 may be programmed to respond to an event in the network 10 by sending a trigger to the protection hardware 36. In some examples, the software module 34 may include a trigger module 134 to send the trigger. The trigger may facilitate a control-plane change in the network 10 via the protection hardware 36. For example, the protection hardware, possibly via an interaction between the switch protection module 106 and the action module 102, may be wired to coordinate with the network and/or to adapt the switching infrastructure 32 after receiving the trigger from the software module 34 to effectuate the hardware-driven, control-plane change. Use of a trigger from the software module 34 may provide an alternative, hybrid approach to effectuate changes via the protection hardware 36, as compared against approaches in which the protection hardware 36 autonomously determines to take steps to effectuate a change.

Another alternative may involve input from a network administrator. For example, the software module 34 may be provided with an administrator interface 136a. The administrator interface 136a may be programmed to receive an operations-administration-and-maintenance command from a network administrator. Such a command may call for one or more direct actions to effectuate a control-plane change in the network 10 and/or may call for the alteration of the present state in the master state machine 130. By way of example and not limitation, with respect to the ITU-T G.8032 network protection protocol, examples of such commands may include commands associated with the manual switch and forced switch states. Furthermore, the software module 34 may be programmed to change a present state of the master state machine 130 in response to one or more different operations-administration-and-maintenance commands.

Also, the protection hardware 36 may be wired to take over implementation of the network protection protocol at certain times. For example, the protection hardware 36 may be wired to take over implementation of the network protocol during a period when the software module 34 receives a software upgrade. Additionally, some embodiments may also include a configuration module 138 separate and apart from the software module 36 and the protection hardware 36. The configuration module may facilitate the handover of operations from the software module 34 to the protection hardware 36 and vice versa.

The configuration module 138 may reside on a line card 92 and rely on a CPU 94 on the line-card to execute its operations. Additionally, the configuration module 138 may include a master/slave relationship module 140 to set up the master/slave relationship between the software module 34 and the protection hardware 36 in terms of a state-machine network protection protocol implemented on the software module 34 and the protection hardware 36. Additionally, in some examples, the administrator interface 136b may reside with the configuration module, as opposed to the software module 34. In such examples, the administrator interface 136b may relay one or more network administrator commands to either the software module 34 and/or the protection hardware 36. Where such commands relate to a state in a state-machine implementation, the administrator interface 136b may relay such commands to master state machine 132 and/or proved a change of state to the state variable 132 in the protection hardware 36.

Figure 9:
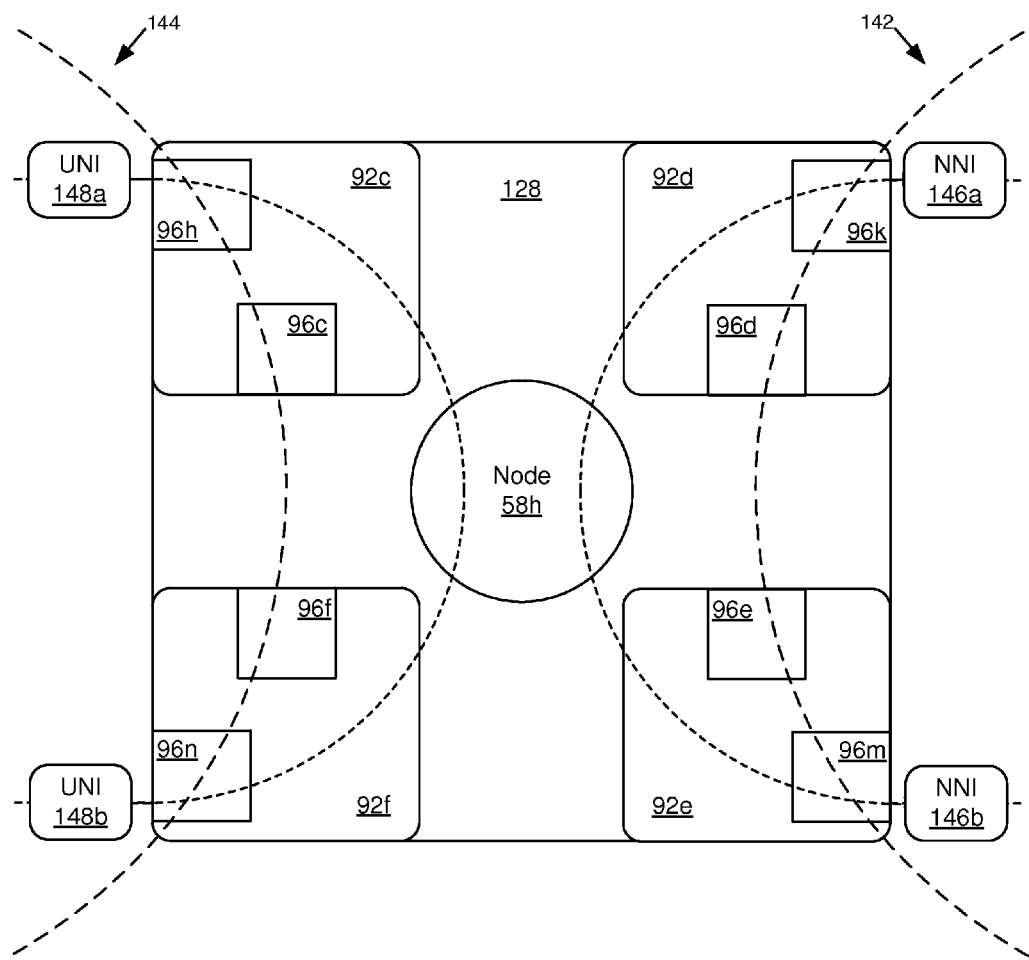
FIG. 9 is a schematic block diagram of a node with four line cards connecting two rings, one ring through a pair of network-to-network interfaces and another ring through a pair of user-to-network interfaces, in accordance with an embodiment of the present invention.

Referring to FIG. 9, a protection node 58h in the network may include any number of ports 96 supporting any number of different types of links 24/26. By way of example, and not limitation, an exemplary protection node 58*h* is depicted in FIG. 9. The exemplary protection node 58*h* may connect a first ring 142 of nodes 58 with a second ring 144 of nodes 58*h*. The first ring 142 may make up backbone ring 142, such as a Provider Backbone Bridge Traffic Engineering (PBB-TE) ring 142 of a carrier class network 10. The second ring 144 may make up a client ring 144. In other examples, a node 58 may connect additional numbers of backbone rings 142 and/or client rings 144, and may also support subring configurations. In certain examples, the exemplary node may be located at an access level 20 switch 16 in a network 10.

The protection node 58*h* may be implemented with four line cards 92*h*-92*f*, which may be interconnected with an instance of switch fabric 128. Individual line cards 92 may support two ring ports 96, a fabric port 96*c*-96*f* and a front port 96*h*-96*n*. A fabric port 96*d*-96*f* may make use of the fabric interface 42 in the switching infrastructure 32; and, a front port 96*h*-96*n* may make use of the network interface 40 in the switching infrastructure. In implementing a network protection protocol, blocking 30 and unblocking 78 operations may be reserved to the front ports 96*h*-96*n*.

A front port 96 on each line card 92 may support a line interface to receive and transmit frames with destination MAC addresses in accordance with switching functions provided by the line card 92. The fabric interface 42 in switching infrastructure 32 may receive frames from and transmit frames to switching fabric 128 within the network 10 in accordance with the switching functions. Line interfaces of certain line cards 92*d*, 92*e* in the node 58*f* may be communicatively coupled to Network-to-Network Interfaces (NNIs) 146*a*, 146*b*. Additionally, line interfaces of other line cards 92*c*, 92*f* in the node 58*h* may be communicatively coupled to User-Network Interfaces 148*a*, 148*b*.

Using the exemplary protection node 58*h* described with respect to FIG. 9 as a platform, examples of the way in which software modules 34 and protection hardware 36 may interact to implement a network protection protocol may be discussed. FIGS. 10 through 13 depict such example interactions. In the figures, the interactions between software modules 34 and protection hardware 36 implement a network protection protocol in response to various exemplary remote events within a network 10 in relation to different nodes playing different roles in a ring protection switching protocol.

Figure 10:
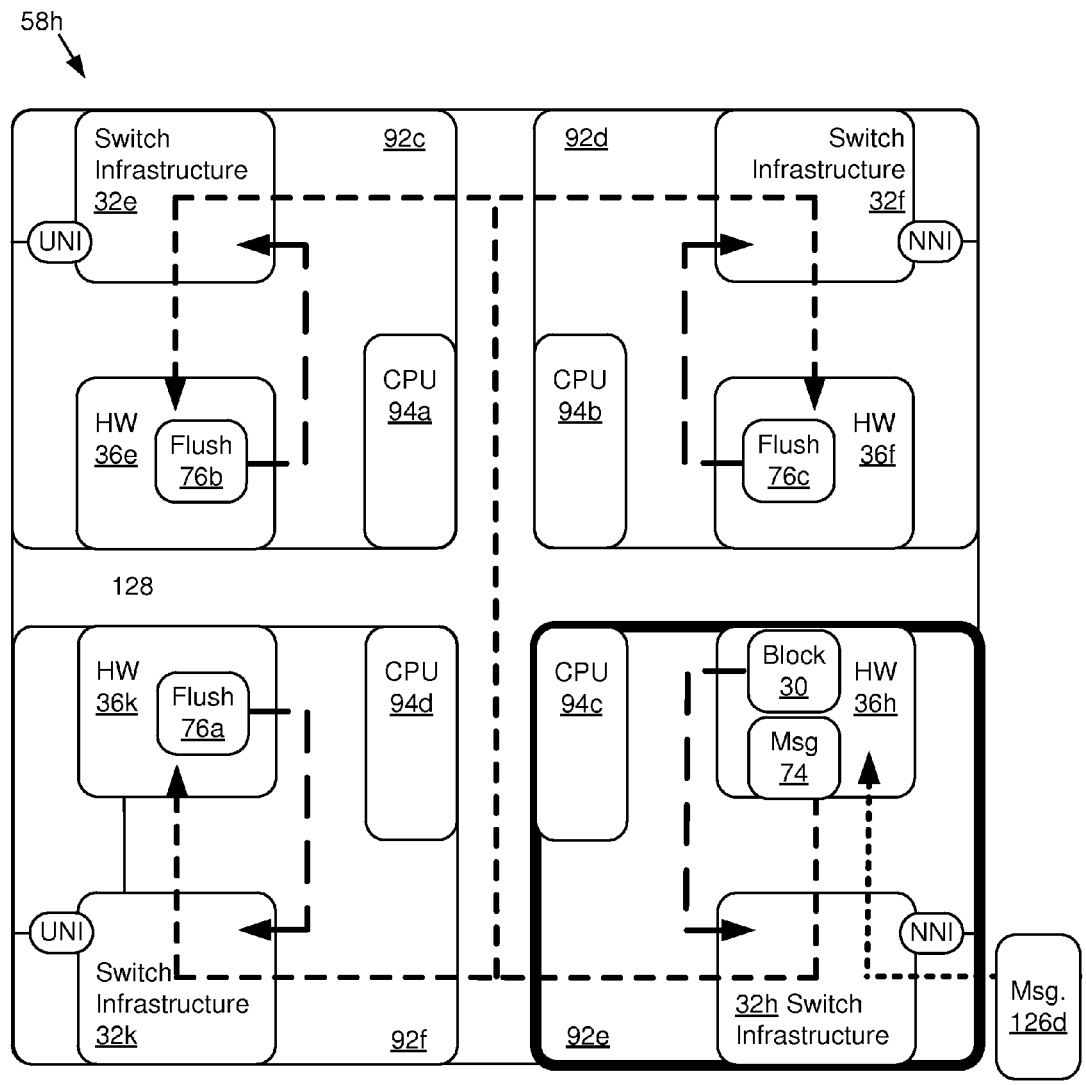
FIG. 10 is a schematic block diagram of a hardware-implemented blocking operation at an owner of a ring protection link, initiated by a directly received network message, together with the corresponding operations of generating and distributing a flush message from the protection hardware, as required by a ring switching protection protocol, in accordance with an embodiment of the present invention.

Referring to FIG. 10, the exemplary protection node 58*h* is used to depict a hardware-implemented blocking operation 30 at an ORPL line-card 92*e*. Associated messaging operations 74 and flush operations 76 at additional line cards 92*c*, 92*d*, 92*f* on the node 58*h* are also depicted, all in accordance with a ring protection switching protocol. As in FIG. 9, the example node 58*h* may include four line cards 92*c*, 92*d*, 92*e*, 92*f* interconnected by switching fabric 128. The four line cards 92*c*, 92*d*, 92*e*, 92*f* may each include a CPU 94*a*-94*c*, an instance of switching infrastructure 32*e*, 32*f*, 32*h*, 32*k*, and an instance of protection hardware 36*e*, 36*f*, 36*h*, 36*k*.

One particular line card 92*e*, indicated with a bold outline, may serve as an ORPL 92*e*. The ORPL 92*e* may have performed an unblock operation 78 in response to a failure 64 in a ring to which the ORPL pertains. The ORPL 92*e* may receive a message 126*d* originating remotely in a network 10 indicative of a recovery 84 on the previously failed link 26. Switching infrastructure 32*h* may drop a copy of the message 126*d* to protection hardware 36*h* residing at the ORPL 92*e*, in a manner that may be similar to that discussed above with respect to FIG. 7. In response, the protection hardware 36*h* may interface with the switching infrastructure 32*h* to perform a block operation 30 over the same port 96 at which the message 126*d* was received.

Additionally, the protection hardware 36*h* may generate a message to initiate flush operations 76*a*-76*c* at the other line cards 92*c*, 92*d*, 92*f*, in a manner that may be similar to that discussed above with respect to FIG. 7. The messaging operation 74 may be carried out over the switch fabric 128, providing the flush message to the corresponding instances of switching infrastructure 32*e*, 32*f*, 32*k* for communication to corresponding instances of protection hardware 36*e*, 36*f*, 36*k*. The corresponding instances of protection hardware 36*e*, 36*f*, 36*k* may then engage the corresponding instances of switching infrastructure 32*e*, 32*f*, 32*k* to perform the relevant flush operations 76*a*-76*c*.

Figure 11:
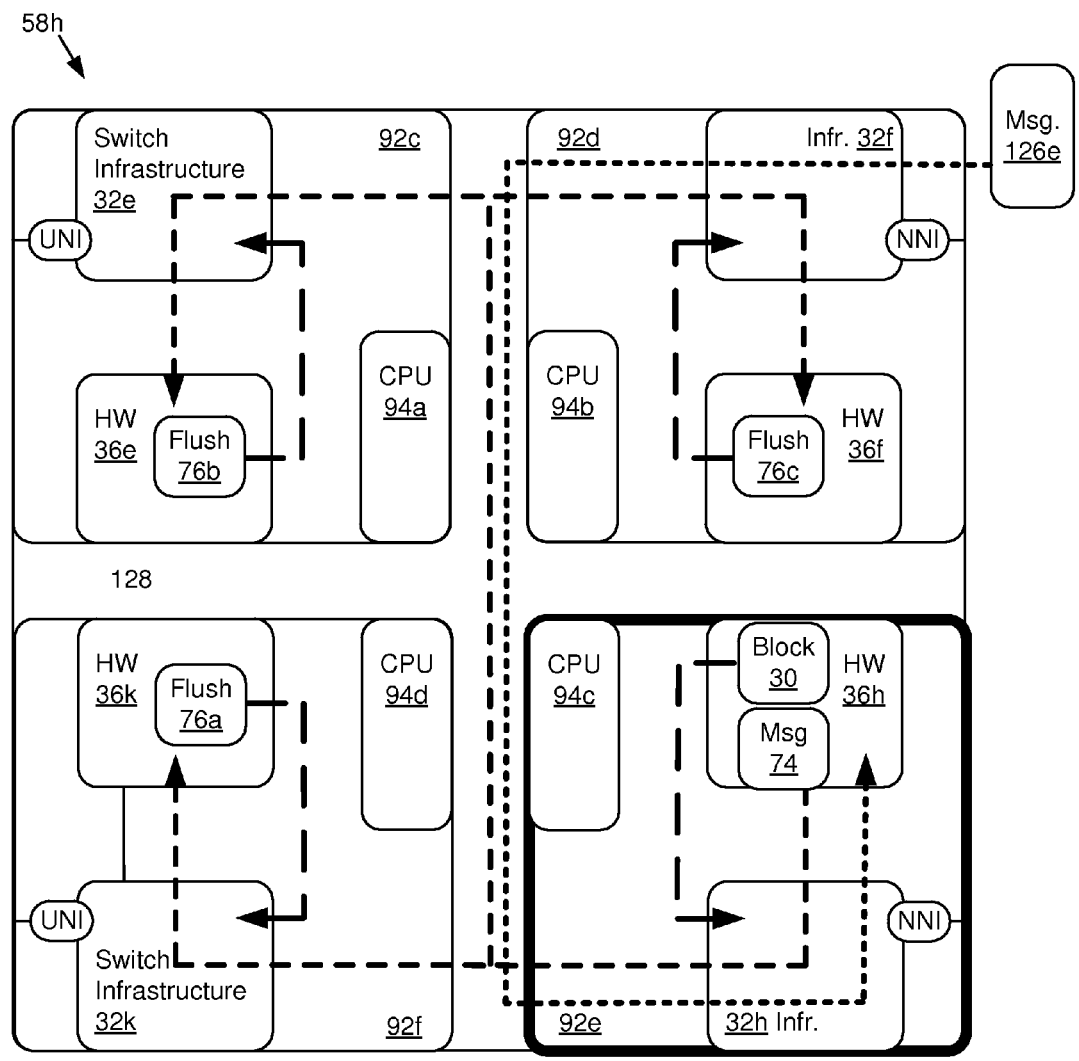
FIG. 11 is a schematic block diagram of a hardware-implemented blocking operation at an owner of a ring protection link, initiated by an indirectly received network message, together with the corresponding operations of generating and distributing a flush message from the protection hardware, as required by a ring switching protection protocol, in accordance with an embodiment of the present invention.

Referring to FIG. 11, the exemplary protection node 58*h* is used to depict an example, hardware-implemented blocking operation 30 at an ORPL line-card 92*e* in response to a message 126*e* received at another line card 92*d*. Again, the example node 58*h* may include four line cards 92*c*, 92*d*, 92*e*, 92*f* interconnected by switching fabric 128. The four line cards 92*c*, 92*d*, 92*e*, 92*f* may each include a CPU 94*a*-94*c*, an instance of switching infrastructure 32*e*, 32*f*, 32*h*, 32*k*, and an instance of protection hardware 36*e*, 36*f*, 36*h*, 36*k*. One line-card 92*e*, indicated in bold, implements an ORPL 92*e*.

As with FIG. 10, the ORPL 92*e* may have performed an unblock operation 78 in response to a failure 64 in a ring to which the ORPL 92*e* pertains. The message 126*e* may indicate a recovery 84 on the previously failed link 26. The message 126*e* may be relayed through the switching infrastructure 32*f* at the other line card 92*d* through the switch fabric 128 to the switching infrastructure 32*h* at the ORPL 92*e*. The switching infrastructure 32*h* at the ORPL 92*e* may then drop a copy of the message 126*e* to the protection hardware 36*h*, which may engage the switching infrastructure 136*h* to realize the blocking operation 30. Additional messaging 74 and flushing 76*a*-76*c* operations may then be performed along lines similar to those discussed in the proceeding figure.

Figure 12:
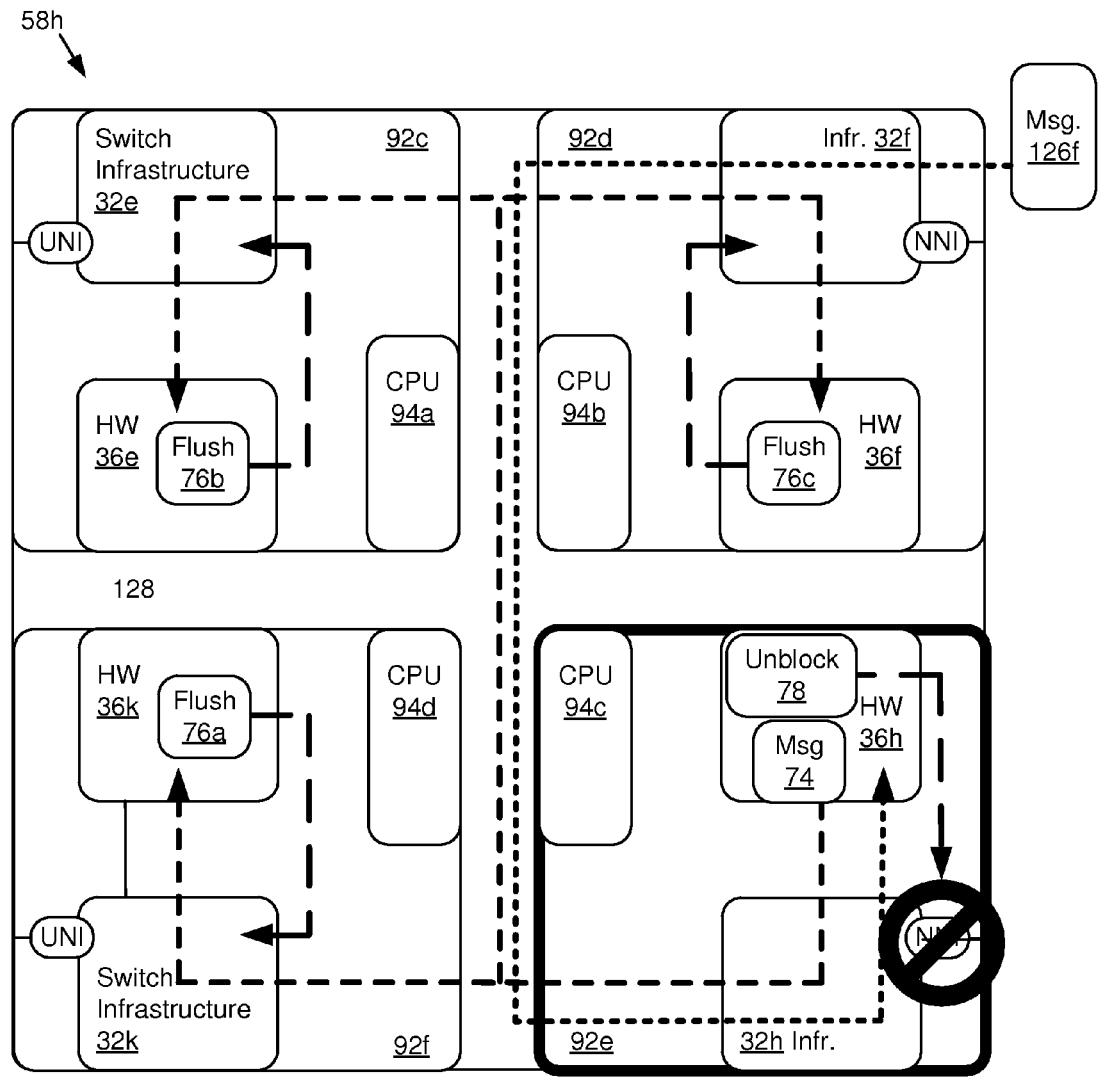
FIG. 12 is a schematic block diagram of a hardware-implemented unblocking operation at an owner of a ring protection link, together with the corresponding operations of generating and distributing a flush message from the protection hardware, as required by a ring switching protection protocol, in accordance with an embodiment of the present invention.

Referring to FIG. 12, the exemplary protection node 58*h* is used to depict an example, hardware-implemented unblocking operation 78 at an ORPL line-card 92*e* in response to a message 126*f* received at another line card 92*d*. As before, the example node 58*h* may include four line cards 92*c*, 92*d*, 92*e*, 92*f* interconnected by switching fabric 128, each line card 92*c*, 92*d*, 92*e*, 92*f* may include a CPU 94*a*-94*c*, an instance of switching infrastructure 32*e*, 32*f*, 32*h*, 32*k*, and an instance of protection hardware 36*e*, 36*f*, 36*h*, 36*k*. One line-card 92*e*, indicated in bold, may implement an ORPL 92*e*.

A message 126*f*, which may convey information about a failure 64 at a link 26 elsewhere in the network 10, may be received at a line card 92*d* other than the ORPL 92*e*. The message 126*f* may be relayed, as discussed in the previous figure, through the switching infrastructure 32*f* in the other line card 92*d*, the switch fabric 128, and the switching infrastructure 32*h* in the ORPL 92*e* to the protection hardware 36*h* of the ORPL 92*e*. The protection hardware 78 may then engage the switching infrastructure 32*h* to perform an unblocking operation 78. The switching infrastructure 32 throughout the node 58*h* may be updated to reflect the unblocking operation 78 by messaging 74 and flushing 76 operations as discussed previously.

Figure 13:
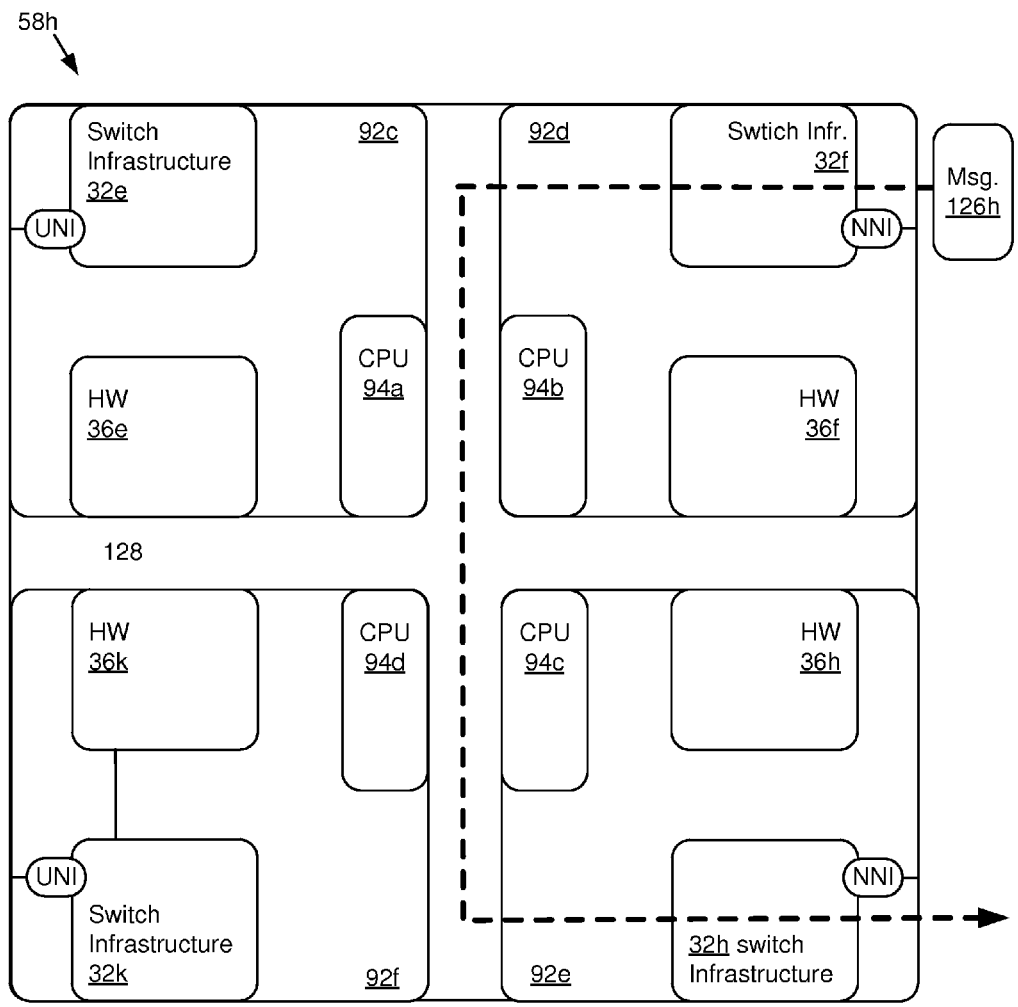
FIG. 13 is a schematic block diagram of line cards at a node participating in a ring switching protection protocol relaying a network message, in accordance with an embodiment of the present invention.

Referring to FIG. 13, the exemplary protection node 58*h* does not include an ORPL line-card. Yet again, however, the example node 58h may include four line cards 92c, 92d, 92e, 92f interconnected by switching fabric 128, each line card 92c, 92d, 92e, 92f may include a CPU 94a-94c, an instance of switching infrastructure 32e, 32f, 32h, 32k, and an instance of protection hardware 36e, 36f, 36h, 36k. The message 126h may include information relevant to a failure 64 or recovery 84, which my entail a need for a blocking 30 or unblocking 78 operation pursuant to a ring protection switching protocol.

However, in the absence of an ORPL, the message may simply be relayed from the switching infrastructure 32f at the line card 92d at which the message 126h is received to switch fabric 128. The switch fabric 128 may direct the message 126h to switching infrastructure 132h on another line card 92e connected to a common ring from which the message 126h was received. The message 126h may thus avoid protection hardware 36. As can be appreciated from this example, the role played by a line card relative to a network protection protocol may play a crucial role with respect to a part played by protection hardware 36 in implementing that network protection protocol.

As can also be appreciated, additional figures may be created and described to explain responses to other events in a network 10. Such explanations may relate to local events occurring at a given line card 92, or additional examples of remotely occurring events. Also, many such explanations could be provided for network protection protocols that are not governed by the nature of a ringed loop.

Figure 14:
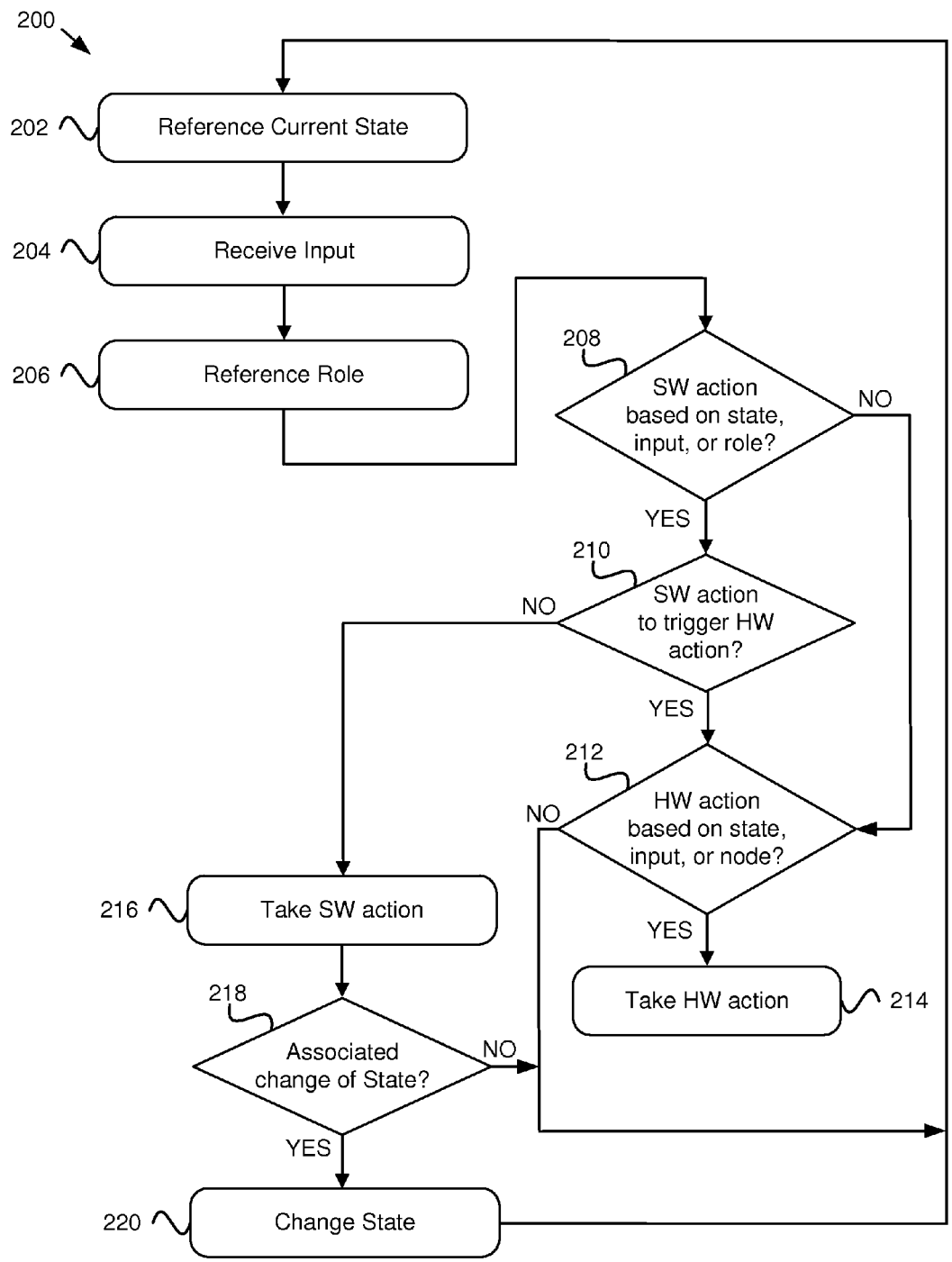
FIG. 14 is a schematic block diagram of details of an additional method for implementing a switching protection protocol through both software and hardware by the implementation of a state machine that takes into account a role played in the protocol by a point where the software and hardware reside, in accordance with an embodiment of the present invention.

The flowchart in FIG. 14 illustrates the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block diagram block or blocks.

It should also be noted that, in some alternative implementations, the functions noted in the blocks may occur out of the order noted in the figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

Referring to FIG. 14, a method 200, or process, for implementing a network protection protocol with both a software module 34 and protection hardware 36 is depicted. The method 200 may include referencing a current state 202 of a state machine implemented by at least one of the protection hardware 36 and/or the software module 34. Additionally, input may be received 204 about one or more events occurring in the network 10 that may be relevant to a network protection protocol. Also, a role played by a flow point 60, node 58, and/or line card 92 relative to the network protection protocol may be referenced 206.

A need for a control-plane change, to be implemented through the switching infrastructure 32, may be determined in response to a current state of a state machine 130, analysis of network protection information, and/or a role played by a flow point 60, node 58, and/or line card 92 relative to the network protection protocol. The need for the control-plane change may be addressed with a response implemented by the software module 34, the protection hardware 36, the protection hardware 36 under the direction of the software module 34, or changing the current state 132 based on the current state and the network protection information.

For example, in some embodiments, a first determination 208 may be made, based on state, event, and/or network role information, as to whether an action should be implemented by the software module 34. If the answer is yes, a second determination 210 may be made, based on state, event, and/or network role information, as to whether that action should be for the software module 34 to trigger an action by the protection hardware 36.

If the answer to the first determination 208 is no, or if the answer to the second determination is yes, a third determination 212 may be made, based on state, event, and/or network role information, as to whether an action should be implemented by the protection hardware 36. If the answer to the third determination 212 is yes, the method 200 may take 214 the appropriate action with the protection hardware 36. If the answer to the third determination 212 is no, the method 200 may return to referencing 202 the current state.

If the answer to the second determination 210 is no, the software module 34 may take 216 the appropriate action. After the software module 34 takes its action 216, a fourth determination 218 may be made as to whether a change of state is appropriate. If the answer is no, the method 200 may return to referencing 202 the current state. If the answer is yes, the state may be changed 220. After changing 220 the state, the method 200 may return to referencing 202 the current state.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. An Ethernet protection switching system comprising:
a switching infrastructure residing at a line card within a network, the switching infrastructure operable to perform switching functions at the line card and comprising one or more of an ingress processor and an egress processor to process and distribute messages;
a central processing unit residing at the line card and communicatively coupled to the switching infrastructure, and configured to execute operations of a software module programmed to effectuate a first subset of potential control-plane actions for the network, in response to a set of events in the network and in accordance with a network protection protocol; and
protection hardware residing at the line card and communicatively coupled to the switching infrastructure and wired to effectuate a hardware-driven, control-plane change from a second subset of potential control-plane actions, in response to the set of events in the network based on the messages from the one of the ingress processor and the egress processor, in accordance with the network protection protocol, using logic circuitry operable at aggregate speeds quicker than those achievable by the software module, wherein the protection hardware uses its circuitry to determine the set of events independent of the software module by analysis of protection information to update the software module and to effectuate the hardware-driven, control-plane change separate from the software module,
wherein the first subset of potential control-plane actions is different from the second subset of potential control-plane actions, and
wherein the protection hardware is directly connected to the switching infrastructure via a dedicated communication pathway for the hardware-driven, control-plane change and is connected to the switching infrastructure and the central processing unit via a bus for the update to the software module.

2. The system of claim 1, further comprising:
a port on the line card configurable to send and to receive a frame with a destination media-access-control address;
a set of internal registers within the switching infrastructure operable both to block and to unblock the port, the set of internal registers directly accessible by the protection hardware; and
a blocking module within the protection hardware wired to access the set of internal registers to block and to unblock the port in response to different events to effectuate the hardware-driven, control-plane change.

3. The system of claim 1, further comprising a messaging module within the protection hardware wired to generate a message for distribution to the network by the switching infrastructure in response to an event to effectuate the hardware-driven, control-plane change in accordance with the network protection protocol.

4. The system of claim 1, further comprising:
a switch database with learned entries, the switch database within the switching infrastructure used by the switching infrastructure to perform switching functions; and
a flushing module within the protection hardware in communication with the switch database and wired to flush a set of learned entries from the switch database in response to an event to effectuate the hardware-driven, control-plane change in accordance with the network protection protocol.

5. The system of claim 1, wherein the protection hardware maintains a state variable consistent with the network protection protocol, and the protection hardware is wired to at least one of coordinate with the network and adapts the switching infrastructure in response to both a present state of the state variable and an event in the network to effectuate the hardware-driven, control-plane change consistent with the network protection protocol.

6. The system of claim 5, further comprising a master state machine in the software module consistent with the network protection protocol, wherein the master state machine controls the state variable maintained in the protection hardware in a master/slave relationship and pushes a change of state at the master state machine to the state variable in the protection hardware.

7. The system of claim 5, further comprising an administrator interface in the software module,
wherein the administrator interface is programmed to receive an operations-administration-and-maintenance command from a network administrator, and
the software module is programmed to change a present state of the master state machine in the software module in response to the operations-administration-and-maintenance command.

8. The system of claim 5, further comprising a coordination module within the protection hardware, the coordination module wired to provide an update of an action taken by the protection hardware to the master state machine of the software module, wherein the software module amends a present state of the master state machine based on the update, in accordance with the network protection protocol.

9. The system of claim 1, wherein the protection hardware is wired to at least one of coordinate with the network and adapts the switching infrastructure based on a role played by a link associated with the line card in the network protection protocol in response to an event to effectuate the hardware-driven, control-plane change.

10. The system of claim 1, wherein the software module is programmed to respond to an event in the first set of events by sending a trigger to the protection hardware to facilitate a control-plane change in the network; and the protection hardware is wired to one of coordinate with the network and to adapt the switching infrastructure, after receiving the trigger from the software module to effectuate the hardware-driven, control-plane change.

11. The system of claim 1, wherein the protecting switching functions are cooperatively performed by the protection hardware and the software module with the protection hardware configured to perform time-critical switching operations with the switching infrastructure and the software module configured to implement a state machine.

12. The system of claim 1, wherein the protection hardware performs the second subset of potential control-plane actions directly with the switching infrastructure independent of the software module, and the protection hardware provides an update of the first subset of potential control-plane actions to the software module.

13. The system of claim 1, wherein
the first subset of potential control-plane actions comprises implementation of a state machine and providing changes to state variables to the protection hardware, and reception of commands related to the state machine, and
the second subset of potential control-plane actions comprises blocking and unblocking ports, generation of messages to coordinate protection activities, and flushing switch database entries.

14. A method for protecting switching functions within a network, the method comprising:
provisioning network protection information to protection hardware residing within a line card in the network;
analyzing the protection information with circuitry in the protection hardware that is configured to determine a need for a control-plane change to protect the network;
responding to the need for the control-plane change with circuitry in the protection hardware wired to interface with switching infrastructure residing on the line card to alter the control plane of the network, wherein the protection hardware is configured to perform a second subset of potential control-plane actions; and
coordinating the control-plane change with a software module executed by a central processing unit residing on the line card and programmed to also make control-plane changes in response to network protection information, wherein the software module is configured to perform a first subset of potential control plane actions, and wherein the protection hardware utilizes its circuitry to determine the need independent of the software module through the analyzing to update the software module and to effectuate the control-plane change prior to the coordinating,
wherein the first subset of potential control-plane actions is different from the second subset of potential control-plane actions,
wherein the switching infrastructure comprises one or more of an ingress processor and an egress processor to process and distribute messages to the protection hardware for the protection information, and
wherein the protection hardware is directly connected to the switching infrastructure via a dedicated communication pathway for the control-plane change and is connected to the switching infrastructure and the central processing unit via a bus for the update to the software module.

15. The method of claim 14, further comprising:
referencing a current state of a state machine implemented by at least one of the protection hardware and the software module;
determining a need for the control-plane change through the switching infrastructure in response to both a current state of the state machine and the network protection information as analyzed;
responding to the need for the control-plane change with a response implemented by one of: the software module, the protection hardware;
directing the protection hardware via the software module; and
changing the current state based on at least one of the current state and the network protection information.

16. The method of claim 14, further comprising:
referencing a relative position of a flow point in the network implemented on the line card; and
determining a need for the control-plane change in response to both the relative position of the node in the network and the network protection information as analyzed.

17. The method of claim 14, wherein the protecting switching functions are cooperatively performed by the protection hardware and the software module with the protection hardware configured to perform time-critical switching operations with the switching infrastructure and the software module configured to implement a state machine.

18. The method of claim 14, wherein the protection hardware performs the second subset of potential control-plane actions directly with the switching infrastructure independent of the software module, and the protection hardware provides an update of the first subset of potential control-plane actions to the software module.

19. The method of claim 14, wherein
the first subset of potential control-plane actions comprises implementation of a state machine and providing changes to state variables to the protection hardware, and reception of commands related to the state machine, and
the second subset of potential control-plane actions comprises blocking and unblocking ports, generation of messages to coordinate protection activities, and flushing switch database entries.

* * * * *